United States Patent
Fubuki et al.

(10) Patent No.: US 9,287,743 B2
(45) Date of Patent: Mar. 15, 2016

(54) MULTILAYERED WOUND COIL, STATOR, AND MANUFACTURING METHOD THEREFOR

(75) Inventors: Shingo Fubuki, Toyota-shi (JP); Keita Okumura, Toyota-shi (JP); Kenji Harada, Miyoshi-shi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 208 days.

(21) Appl. No.: 13/380,634

(22) PCT Filed: Apr. 27, 2010

(86) PCT No.: PCT/JP2010/057401
§ 371 (c)(1),
(2), (4) Date: Dec. 23, 2011

(87) PCT Pub. No.: WO2011/001736
PCT Pub. Date: Jan. 6, 2011

(65) Prior Publication Data
US 2012/0086298 A1    Apr. 12, 2012

(30) Foreign Application Priority Data

Jun. 29, 2009    (JP) ................. 2009-153627

(51) Int. Cl.
*H02K 3/18*    (2006.01)
*H02K 15/095*    (2006.01)
(Continued)

(52) U.S. Cl.
CPC ................ *H02K 3/18* (2013.01); *H01F 41/065* (2013.01); *H02K 15/045* (2013.01); *Y10T 29/49009* (2015.01)

(58) Field of Classification Search
CPC ....................................................... H02K 3/18
USPC ........................... 310/179, 180, 208; 336/224
See application file for complete search history.

(56) References Cited

U.S. PATENT DOCUMENTS 3,691,494 A * 9/1972 Okuyama ........................ 336/70
4,774,428 A * 9/1988 Konecny ........................ 310/198
(Continued)

FOREIGN PATENT DOCUMENTS

JP    2000-245092 A    9/2000
JP    2001-359250 A    12/2001
(Continued)

OTHER PUBLICATIONS

Machine Translation, Shin et al., JP 2005102477 A, Apr. 14, 2005.*
(Continued)

*Primary Examiner* — Thomas Truong
(74) *Attorney, Agent, or Firm* — Kenyon & Kenyon LLP

(57) ABSTRACT

Disclosed are a multilayered wound coil, a stator, and a manufacturing method therefor. The stator is provided with: a stator core comprising laminated steel sheets; and a coil which is wound around a teeth section formed on the stator core and has a plurality of layers formed in the circumferential direction of the stator core. The winding of the coil proceeds in either the radial direction or the circumferential direction of the stator core, whichever direction has fewer adjacent conductors, and doubles back at the end in said direction. This reduces the difference in potential between adjacent conductors, making it possible to ensure insulation between adjacent conductors even with a thinner insulating film.

6 Claims, 18 Drawing Sheets

(51) Int. Cl.
*H01F 41/06* (2006.01)
*H02K 15/04* (2006.01)

(56) References Cited

U.S. PATENT DOCUMENTS

| | | | |
|---|---|---|---|
| 6,255,756 B1 * | 7/2001 | Richter | 310/208 |
| 7,086,136 B2 * | 8/2006 | Gorohata et al. | 29/596 |
| 7,317,372 B2 * | 1/2008 | Yoshimori | 336/189 |
| 2009/0140595 A1 * | 6/2009 | Naganawa et al. | 310/201 |

FOREIGN PATENT DOCUMENTS

| JP | 2005-085560 A | | 3/2005 | |
| JP | 2005102477 A | * | 4/2005 | H02K 3/18 |
| JP | 2007-244115 A | | 9/2007 | |
| JP | 2007-336652 A | | 12/2007 | |
| JP | 2008-109829 A | | 5/2008 | |
| JP | 2009-071939 A | | 4/2009 | |

OTHER PUBLICATIONS

Machine Translation, Nishioka et al., JP 2000245092 A, Sep. 8, 2000.*

Machine Translation, Kawashima et al., JP 2009071939 A, Apr. 2, 2009.*

International Search Report of PCT/JP2010/057401 mailed Jun. 8, 2010.

* cited by examiner

US 9,287,743 B2

MULTILAYERED WOUND COIL, STATOR, AND MANUFACTURING METHOD THEREFOR

CROSS-REFERENCE TO RELATED APPLICATIONS

This is a 371 national phase application of PCT/JP2010/057401 filed on 27 Apr. 2010, claiming priority to Japanese Patent Application No. 2009-153627 filed 29 Jun. 2009, the entire contents of which are incorporated herein by reference.

FIELD OF THE INVENTION

The present invention relates to a technique for winding a coil in a stator to be used in a motor and more particularly to a technique of forming a multilayered coil from a conductor wire.

BACKGROUND OF THE INVENTION

Of motors for vehicles, a motor to be used for driving a car is demanded for reduction in size and increase in output power. Accordingly, the use of a flat rectangular conductor effective in improvement of a space factor has been discussed.

However, when the rectangular conductor is to be used for a coil, it is hard to wind the rectangular conductor in a coiled form due to its wide cross-sectional area. Although a wider cross-sectional area of the rectangular conductor can lead to an increase in current density, a problem with an eddy current arises. Therefore, in forming a coil by winding the rectangular conductor, various reviews or studies have been made.

Patent Document 1 discloses a technique related to a rectangular wire structure, a winding method for rectangular wire, and a winding device.

In the case of winding the rectangular conductor in a multilayered form, using a winding device, a rectangular wire may be laterally dislocated or displaced during winding. In Patent Document 1, to avoid such a problem, the rectangular conductor is partially formed with a recessed or protruding retaining portion and is wound. With this configuration, it is possible to prevent displacement of the rectangular conductor to be wound as second and subsequent layers on the rectangular conductor.

Patent Document 2 discloses a technique related to a winding structure of an electric motor, a winding method and a winding apparatus.

Positioning means is provided to position a rectangular conductor so as to incline a cross section of the conductor at a predetermined angle relative to a line passing the center of a teeth portion of a stator core. The rectangular conductor is wound in a multilayered configuration to form a coil. This positioning means is constituted of an insulator with a stepped surface to retain the rectangular conductor at a slant along the stepped surface. With this configuration, it is possible to prevent positional displacement of the rectangular conductor.

Patent Document 3 discloses a technique related to a stator structure for a rotary electric machine and a manufacturing method of the stator structure.

A pair of rectangular conductors are wound on a teeth portion of a stator core to form a two-layered coil. At that time, assuming that the number of rectangular conductors to be supplied to each teeth portion is P, the number of slots of an entire stator is T, and the number of neutral points is S, the winding wire is twisted between teeth portions at intervals of N pieces that satisfy the relation: $T=3 \times S \times P \times N$.

With such configuration, a pair coil can be made from a rectangular conductor. This makes it possible to suppress loss of cyclic currents and others and reduce the cross-sectional area per one rectangular conductor, thus preventing the occurrence of eddy currents or the like.

However, the method of forming a coil by winding a rectangular conductor as disclosed in Patent Documents 1 and 2 may involve the following problems.

There is first adopted a method of winding a conductor sequentially from a base side of a teeth portion of a stator core basically along the teeth surface to the inside in a radiation direction of the core, and then returning back at a distal end side of the teeth portion to form a second layer. This is regarded as a most general method to wind a coil by use of a winding device.

However, in this winding manner, a returning point of a second layer is located on the base side of the teeth portion. Thus, a winding start portion of the first layer and a winding end portion of the second layer overlap one on the other. A potential difference between a winding start portion and a winding end portion becomes highest when a coil is supplied with currents. Accordingly, in a two-layered coil, a potential difference is highest between a winding start portion of a first layer and a winding end portion of a second layer.

Therefore, a rectangular conductor has to be applied with insulating coating enough to withstand this potential difference and thus it is conceivable that the rectangular conductor needs to be coated with thick insulating coating.

As the thickness of the insulating coating is thicker, however, the space factor decreases, which may inhibit the increase in output power of a motor.

On the other hand, in the stator of Patent Document 3 with the rectangular conductor being wound in pairs, such a problem as in Patent Documents 1 and 2 will not occur. However, a mechanism of a winding device for pair winding is apt to be complex and also the peripheral length of the pair coil on an outer circumferential side is longer than on an inner circumferential side. This causes a resistance difference, which may greatly generate heat in the coil.

Consequently, it may inhibit the increase in output power of a motor.

As a method to solve the problem with potential difference in Patent Documents 1 to 3, the use of a winding method as disclosed in Patent Document 4 is conceivable.

FIG. 10 shows a cross section of a coil in Patent Document 4.

A coil 200 is a wound coil in two layers and four rows (2-layer×4-row) as shown in FIG. 10 by winding a wire to sequentially form an outer layer, an inner layer, another inner layer, and another outer layer. As a result of such winding, a potential difference of adjacent conductors merely occurs by an amount corresponding to four turns. Thus, a reduction in potential difference can be achieved.

As the potential difference is lower, the thickness of the insulating coating to be provided around the conductor can be made thinner. This can realize compact size and high power output of the coil 200.

RELATED ART DOCUMENTS

Patent Documents

Patent Document 1: JP 2001-359250A
Patent Document 2: JP 2007-244115A
Patent Document 3: JP 2008-109829A
Patent Document 4: JP 2005-85560A

SUMMARY OF THE INVENTION

Problems to be Solved by the Invention

However, Patent Document 4 conceivably causes the problems mentioned below.

FIG. 11 shows a first row of a wound coil and FIG. 12 shows a second row of the wound coil.

In the case where the winding method of Patent Document 4 is actually performed, assuming that the order of winding the coil 200 is a side A, a side B, a side C, and a side D, a wire starts to be wound from the side A of a second layer (Layer 2) (outer side) and then along the sides B, C, and D of Layer 2, and shifts to the side A of a first layer (Layer 1) (inner side). The wire is successively wound along the sides B and C of the first layer (inner side) and shifts to the side D. In the side D of the first layer, a bridging portion is formed to be continuous from the first row to a second row.

Then, the wire is wound first along a side A of a first layer of the second row and then a side B, a side C, and a side D of the first layer, and shifts to a second layer. This winding is problematic after the sides B and C of the second layer are formed.

Since the wire has already been wound in the side D of the second row, it is necessary for winding the coil 200 in two-layered configuration to form a bridging portion in the side C of the second layer of the second row to connect to a third row.

However, the wire in the sides A and C has to be inserted in slots of a stator. Thus, a bridging portion if formed in the side C is likely to deteriorate the space factor in the slots.

In the method of Patent Document 4, specifically, even when the coil is formed by winding a wire in two layers, this is less likely to contribute to an increase in space factor of the stator.

The present invention has been made to solve the above problems and has a purpose to provide a multilayered wound coil capable of suppressing the thickness of an insulating coated layer, a stator, and a manufacturing method therefor.

Means of Solving the Problems

To achieve the above purpose, one aspect of the invention provides the following configurations.

(1) In a stator including a stator core formed with a teeth portion and a slot, and a coil made of a conductor in a wound state including a plurality of layers (n layers) in a circumferential direction of the stator core when the coil is inserted in the slot, the coil includes a first row wound from an outer layer toward an inner layer, a second row wound from the inner layer toward the outer layer, a third row wound from the outer layer toward the inner layer, with respect to the number n of layers of an insertion portion of the coil inserted in the slot, the number of layers in a coil end portion on at least one side is n+1 or more, and the coil includes: a first bridging portion formed in an innermost layer in the coil end on the lead side to connect the first row and the second row, and a second bridging portion formed in an outermost layer in the coil end on the lead side to connect the second row and the third row.

(2) In the stator of (1), preferably, at least one of the first bridging portion and the second bridging portion includes a first end section, a second end section, and a lane change section positioned between the first end section and the second end section, the first end section and the second end section are formed to conform to the conductor in an adjacent layer, and the conductor is lane-changed to an adjacent row in the lane change section.

To achieve the above purpose, a multilayered wound coil in another aspect of the invention provides the following configurations.

(3) In a multilayered wound coil including a conductor wound in a plurality of layers (n layers), the conductor is wound from an outer layer toward an inner layer in a first row, from the inner layer toward the outer layer in a second row, and from the outer layer toward the inner layer in a third row, and the number of layers in a coil end on at least one side is n+1 or more, the coil includes: a first bridging portion formed in an innermost layer in the coil end on the lead side to connect the first row and the second row, and a second bridging portion formed in an outermost layer in the coil end on the lead side to connect the second row and the third row.

(4) In the coil of (3), preferably, at least one of the first bridging portion and the second bridging portion includes a first end section, a second end section, and a lane change section positioned between the first end section and the second end section, the first end section and the second end section are formed to conform to the conductor in an adjacent layer, and the conductor is lane-changed to an adjacent row in the lane change section.

To achieve the above purpose, a stator manufacturing method in another aspect of the invention provides the following configurations.

(5) In a method of manufacturing a stator including a coil wound in a plurality of layers (n layers) in a circumferential direction of a stator core, the coil being inserted in a slot portion formed in the stator core, the coil is formed by winding a conductor from an outer layer toward an inner layer in a first row, from the inner layer toward the outer layer in a second row, and from the outer layer toward the inner layer in a third row, and the number n of layers in a coil end on a lead side of the coil is n+1 or more, and the coil includes: a first bridging portion formed in an innermost layer in the coil end on the lead side to connect the first row and the second row, and a second bridging portion formed in an outermost layer in the coil end on the lead side to connect the second row and the third row.

(6) In the stator manufacturing method of (5), preferably, a bridging portion to connect adjacent rows is formed in the coil end on the lead side by pressing the bridging portion in an axial direction of the coil with a forming jig.

Effects of the Invention

The stator in one aspect of the invention configured as above can provide the following operations and effects.

The aspect (1) of the invention provides a stator including a stator core formed with a teeth portion and a slot, and a coil made of a conductor in a wound state including a plurality of layers (n layers) in a circumferential direction of the stator core when the coil is inserted in the slot, wherein the coil includes a first row wound from an outer layer toward an inner layer, a second row wound from the inner layer toward the outer layer, a third row wound from the outer layer toward the inner layer, with respect to the number n of layers of an insertion portion of the coil inserted in the slot, the number of layers in a coil end portion on a lead side is n+1 or more, and the coil includes: a first bridging portion formed in an innermost layer in the coil end on the lead side to connect the first row and the second row, and a second bridging portion formed in an outermost layer in the coil end on the lead side to connect the second row and the third row.

The coil of the invention is formed in such a way that, assuming that a coil is for example wound in two layers in a circumferential direction of a stator core and six rows in a radial direction of the stator core, in the case of starting winding from a second layer-first row, the winding proceeds in a first layer-first row, and then to the first layer-second row, the second layer-second row, the second layer-third row, and the first layer-third row, . . .

In a coil end on the lead side, the layers are formed in the number of layers: n+1, i.e., three layers in the aforementioned example, more than the layers of each of other sides. This is not disclosed in Patent Document 4.

According to the aspect of the invention, even when a coil is formed in a two-layered configuration, this two-layered coil can be formed without contradiction by forming a three-layered part. This is because the winding proceeds from the side C of the second layer shown in FIG. 12 to a side D of a third layer, so that the wire can avoid interfering with the wire in the side D of the second layer.

As a result, the insulating coating used for the conductor has only to be thick so as to withstand a potential difference between the second layer-first row and the second layer-second row. An example is assumed that a coil is formed according to the method conducted by winding a conductor sequentially from a base side of a teeth portion of the stator core to the inside of the core in the radial direction along the teeth surface, and then returning back at the distal end of the teeth portion to form a second layer. In this example, when a voltage of 100V is applied to the coil from a winding start portion to a winding end portion, the coil must withstand a potential difference of 100V. In contrast, in the stator disclosed in (1) of the invention, a first turn and a fourth turn are located adjacently. Thus, the coil has only to withstand a potential difference about one-third of that in the aforementioned example. As the number of turns increases, the potential difference can be decreased.

As above, since the thickness of the insulating coating used for the conductor can be suppressed. This can improve the space factor when the conductor is wound around the stator core. Further, a reduction in cost can also be achieved simply because the thickness of the insulating coating can be thin.

Furthermore, since the bridging portion of the coil is formed in the coil end, there is no longer necessary to avoid interference between wire portions inserted in each slot. This contributes to improvement of the space factor in the slot.

According to the above configuration (2) of the invention, in the stator of (1), at least one of the first bridging portion and the second bridging portion includes a first end section, a second end section, and a lane change section positioned between the first end section and the second end section, the first end section and the second end section are formed to conform to the conductor in an adjacent layer, and the conductor is lane-changed to an adjacent row in the lane change section.

Since the bridging portion is provided with the first end section and the second end section and it undergoes lane change to an adjacent row in the lane change section, it is possible to suppress an increase in lamination thickness of the coil caused by deformation of the conductor due to lane change.

In the multilayered coil having two or more layers, a turn involving the lane change and another turn involving no lane change are arranged adjacently depending on the winding manner. The winding in the aspect disclosed in (1) corresponds to this case. In such a case, if the conductor is deformed for lane change, even a side of the conductor adjacent to another side including the lane change section is likely to be deformed due to lane change, resulting in an increase in lamination thickness of the coil.

However, the lane change section is provided between the first end section and the second end section and these first and second end sections are shaped to extend along the adjacent layer. Accordingly, it is possible to suppress the influence of deformation of the conductor of the lane change section from reaching the adjacent side.

As a result, the lamination thickness of the coil is not increased. This can contribute to an increase in space factor of the stator.

The multilayered wound coil in another aspect of the invention configured as above can provides the following operations and effects.

According to the configuration (3) of the invention, in a multilayered wound coil including a conductor wound in a plurality of layers (n layers), the conductor is wound from an outer layer toward an inner layer in a first row, from the inner layer toward the outer layer in a second row, and from the outer layer toward the inner layer in a third row, and the number of layers in a coil end on a lead side is n+1 or more, the coil includes: a first bridging portion formed in an innermost layer in the coil end on the lead side to connect the first row and the second row, and a second bridging portion formed in an outermost layer in the coil end on the lead side to connect the second row and the third row.

It is therefore possible to reduce a potential difference between adjacently located portions of the conductor when supplied with currents and thus realize a coil with a small thickness of the insulating coating used for the conductor.

Further, it is possible to reduce a potential difference between adjacently located portions of the conductor when supplied with currents as in (2) and thus realize a coil with a small thickness of the insulating coating used for the conductor.

According to the configuration (4) of the invention, in the coil of (3), at least one of the first bridging portion and the second bridging portion includes a first end section, a second end section, and a lane change section positioned between the first end section and the second end section, the first end section and the second end section are formed to conform to the conductor in an adjacent layer, and the conductor is lane-changed to an adjacent row in the lane change section.

As with the stator disclosed in (2), therefore, the first end section and the second end section are provided and the lane change section for making lane change of the conductor to an adjacent row is formed between the first and second end sections. Accordingly, it is possible to suppress the influence of deformation of the conductor in the lane change section from reaching the adjacent part (side) provided with the lane change section and the adjacent part.

The stator manufacturing method in another aspect of the invention configured as above can provide the following operations and effects.

According to the configuration (5) of the invention, in a method of manufacturing a stator including a coil wound in a plurality of layers (n layers) in a circumferential direction of a stator core, the coil being inserted in a slot portion formed in the stator core, the coil is formed by winding a conductor from an outer layer toward an inner layer in a first row, from the inner layer toward the outer layer in a second row, and from the outer layer toward the inner layer in a third row, and the number n of layers in a coil end on a lead side of the coil is n+1 or more, the coil includes: a first bridging portion formed in an innermost layer in the coil end on the lead side to connect the first row and the second row, and a second bridging portion formed in an outermost layer in the coil end on the lead side to connect the second row and the third row.

When the coil with a low potential difference between adjacently located portions of the conductor is formed and then is inserted in the stator core, the stator can be manufactured with a high space factor.

According to the configuration (6) of the invention, in the stator manufacturing method of (5), a bridging portion to connect adjacent rows is formed in the coil end on the lead side by pressing the bridging portion in an axial direction of the coil with a forming jig.

Since the manufacturing method achieved by pressing the bridging portion in the axial direction of the coil by use of the forming jig, it is possible to form a coil by sequentially winding the conductor with the forming jig installed in a coil winding device.

DETAILED DESCRIPTION

A detailed description of a first preferred embodiment of the present invention will now be given.

(First Embodiment)

Figure 1:
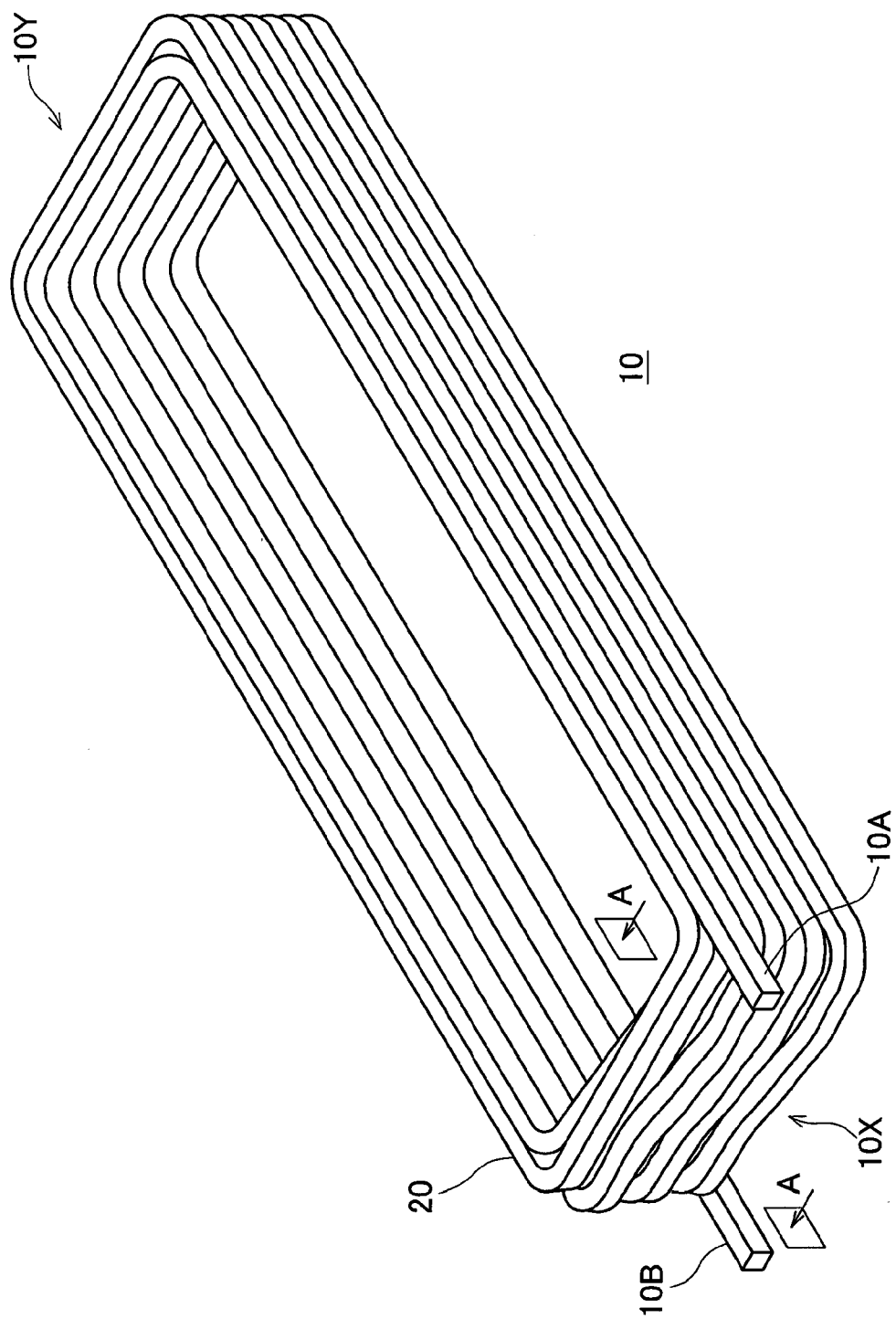
FIG. 1 is a perspective view of a coil in a first embodiment.
Figure 2:
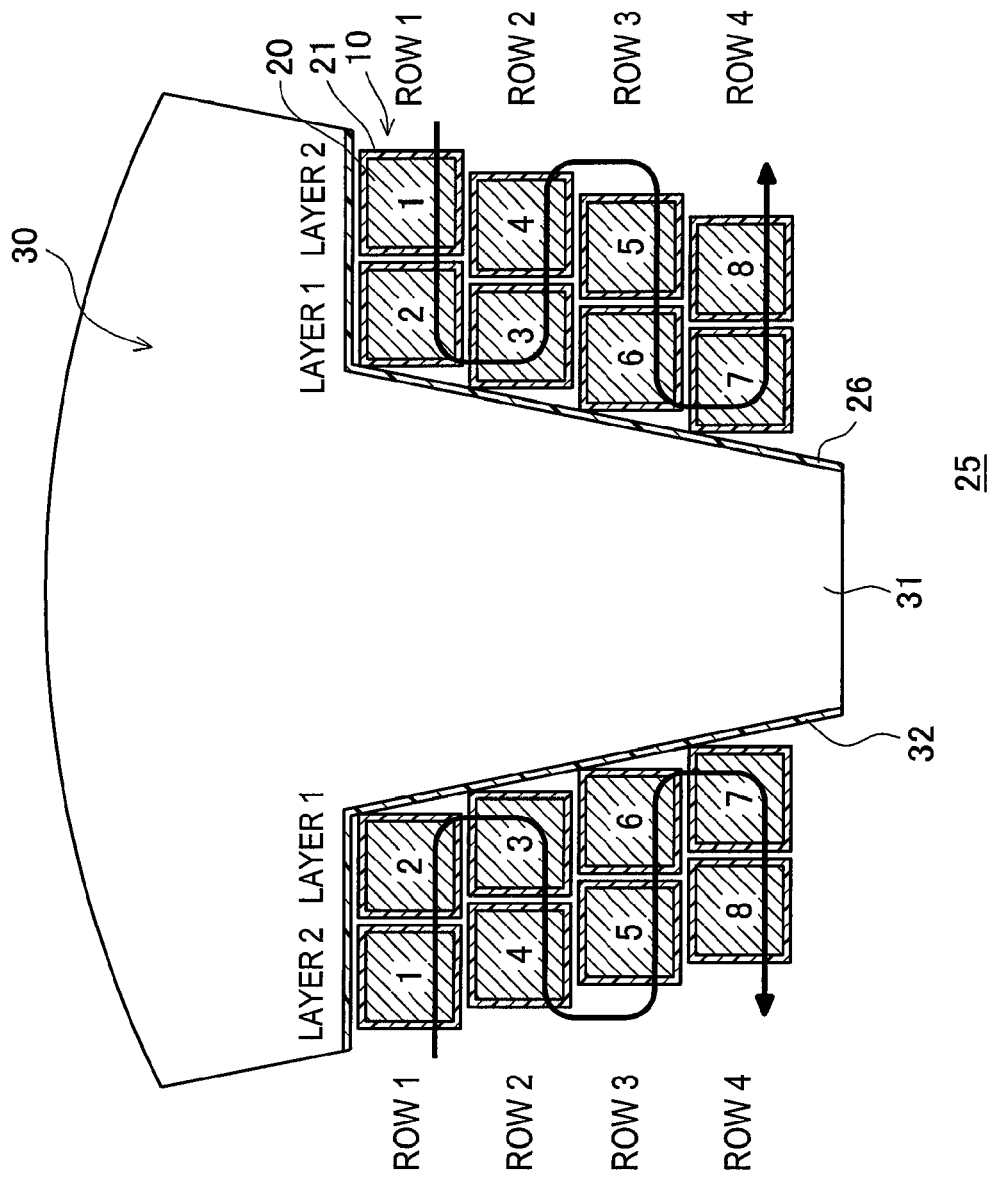
FIG. 2 is a cross sectional view of the coil mounted on a split type stator core in the first embodiment.
Figure 3:
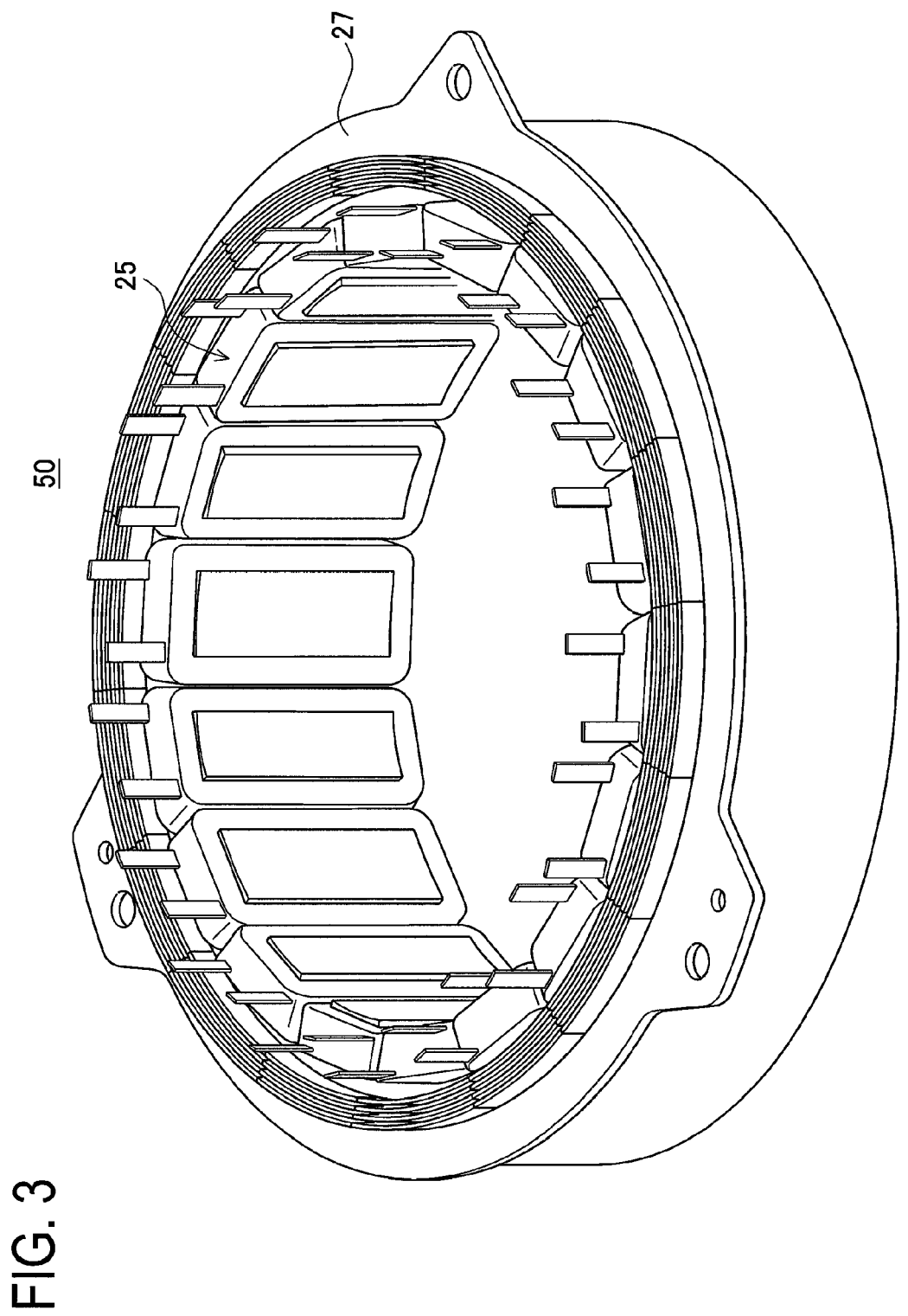
FIG. 3 is a perspective view of the stator in the first embodiment.

FIG. 1 is a perspective view of a coil in a first embodiment. FIG. 2 is a cross sectional view of the coil mounted on a split type stator core. In FIG. 2, the coil is shown with eight turns for convenience of explanation. FIG. 3 is a perspective view of a stator.

A coil 10 is formed by winding a flat rectangular conductor 20. This conductor 20 is a metal wire superior in electric conduction property, such as copper, having an outer surface applied with an insulating coating film 21. The rectangular conductor 20 has a rectangular cross section.

This rectangular conductor 20 is wound in two layers and six rows (2-layer×6-row), resulting in a coil 10 shown in FIG. 1.

Assuming that the row is defined in the radial direction of a split core unit 25 and the layer is defined in the circumferential direction of the same, the coil 10 is formed by winding the rectangular conductor 20 by twelve turns with two layers and six rows.

A stator core piece 30 is a member constituting the split core unit 25 and is made of laminated electric steel sheets. Each core piece 30 is formed with a teeth portion 31. The core pieces 30 are arranged in a cylindrical shape to form the core unit 25.

The coil 10 is mounted on the teeth portion 31 by interposing an insulator 26 therebetween. The core pieces 30 in this state are arranged in the cylindrical shape and then an outer ring 27 is fitted around the core pieces 30, thus completing a stator 50. In FIG. 3, each core piece 30 is resin molded for the purpose of taking measures against vibration or the like.

Winding steps of the coil 10 will be explained below.

Figure 4:
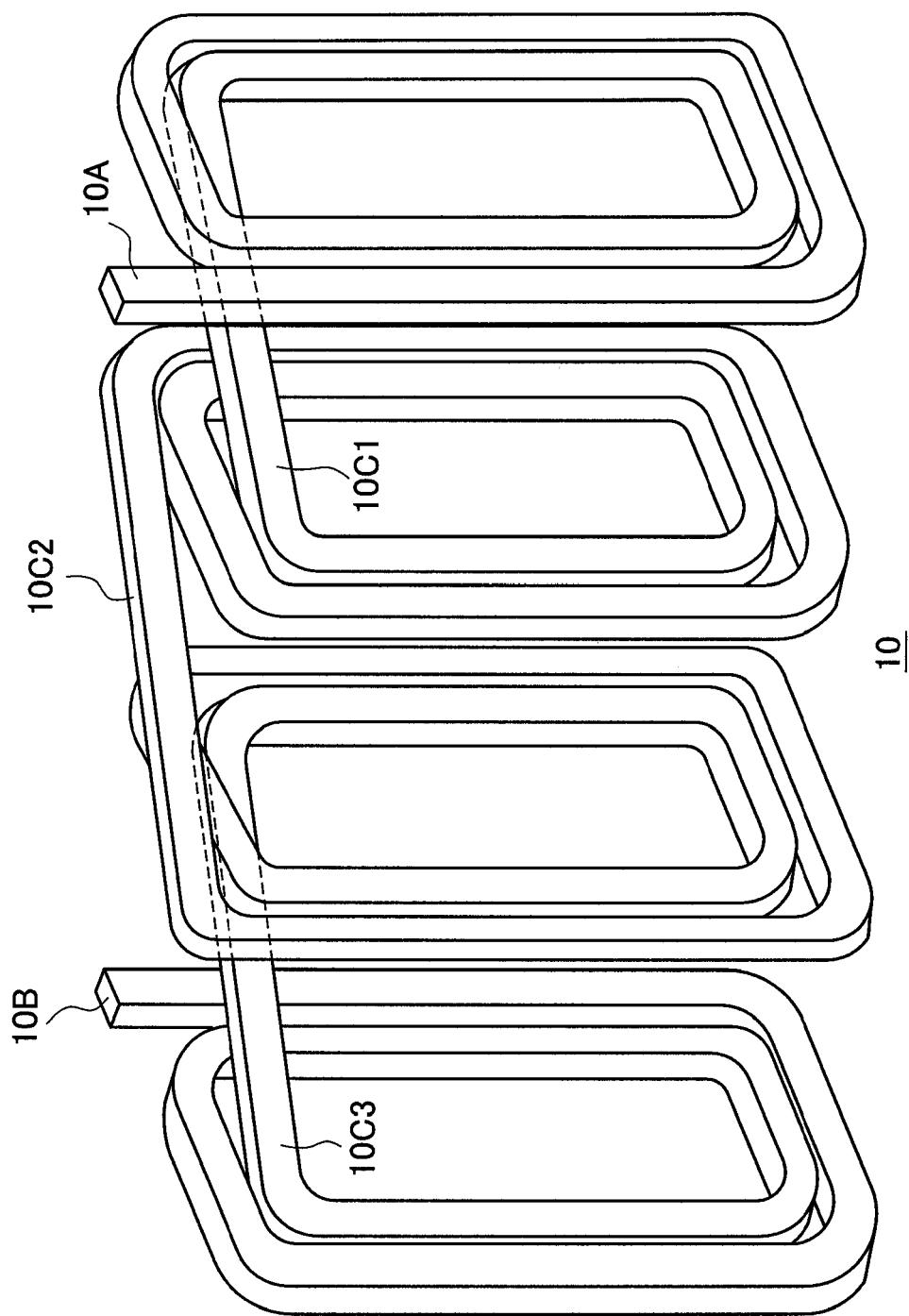
FIG. 4 is an exploded perspective view of the coil in the first embodiment.

FIG. 4 is an exploded perspective view of the coil.

A winding for the coil 10 in FIG. 4 starts to first form a second layer (LAYER 2)-first row (ROW 1) in FIG. 2 as seen by comparison with FIG. 2. Thus, a winding start portion 10A is located in LAYER 2-ROW 1. The numerals given at the center of each cross section of the rectangular conductor 20 in FIG. 2 represent the number of turns. The number of turns is defined by counting, as one turn, one winding of a coil 10 by a winding device 100 mentioned later.

In a first turn of the coil 10, the conductor is wound by one turn to form LAYER 2-ROW 1 which is an outer circumferential side of the coil 10. In a second turn, the conductor is wound to form LAYER 1-ROW 1 which is an inner circumferential side of the coil 10. In other words, the winding proceeds inward in the circumferential direction of the split core unit 25 from the first turn to the second turn.

At a lead side 10X of the coil 10, a first bridging portion 10C1 is formed to extend from LAYER 1-ROW 1 to LAYER 1-ROW 2, then the conductor shifts to a third turn.

In a third turn, the conductor is wound to form LAYER 1-ROW 2 which is the inner circumferential side of the coil 10. At the lead side 10X, the conductor shifts to LAYER 2-ROW 2. In a fourth turn, the conductor is wound to form LAYER 2-ROW 2 which is the outer circumferential side of the coil 10.

At the lead side 10X of the coil 10, a second bridging portion 10C2 is formed to extend from LAYER 2-ROW 2 to LAYER 2-ROW 3 to shift to a fifth turn. In other words, the winding is turned from the second turn and proceeds outward in the circumferential direction of the core unit 25 to form the third turn and the fourth turn.

In the fifth turn, the conductor is wound to form LAYER 2-ROW 3 which is the outer circumferential side of the coil 10. In a sixth turn, the conductor is wound to form LAYER 1-ROW 3 which is the inner circumferential side of the coil 10.

At the lead side 10X of the coil 10, a third bridging portion 10C3 is formed to extend from LAYER 1-ROW 3 to LAYER 1-ROW 4 and shift to a seventh turn. In other words, the winding is turned from the fourth turn and proceeds inward in the circumferential direction of the core unit 25 to form the fifth turn and the six turn.

In a seventh turn, the conductor is wound to form LAYER 1-ROW 4 which is the inner circumferential side of the coil 10. In an eighth turn, the conductor is wound to form LAYER 2-ROW 4 row which is the outer circumferential side of the coil 10.

Figure 5:
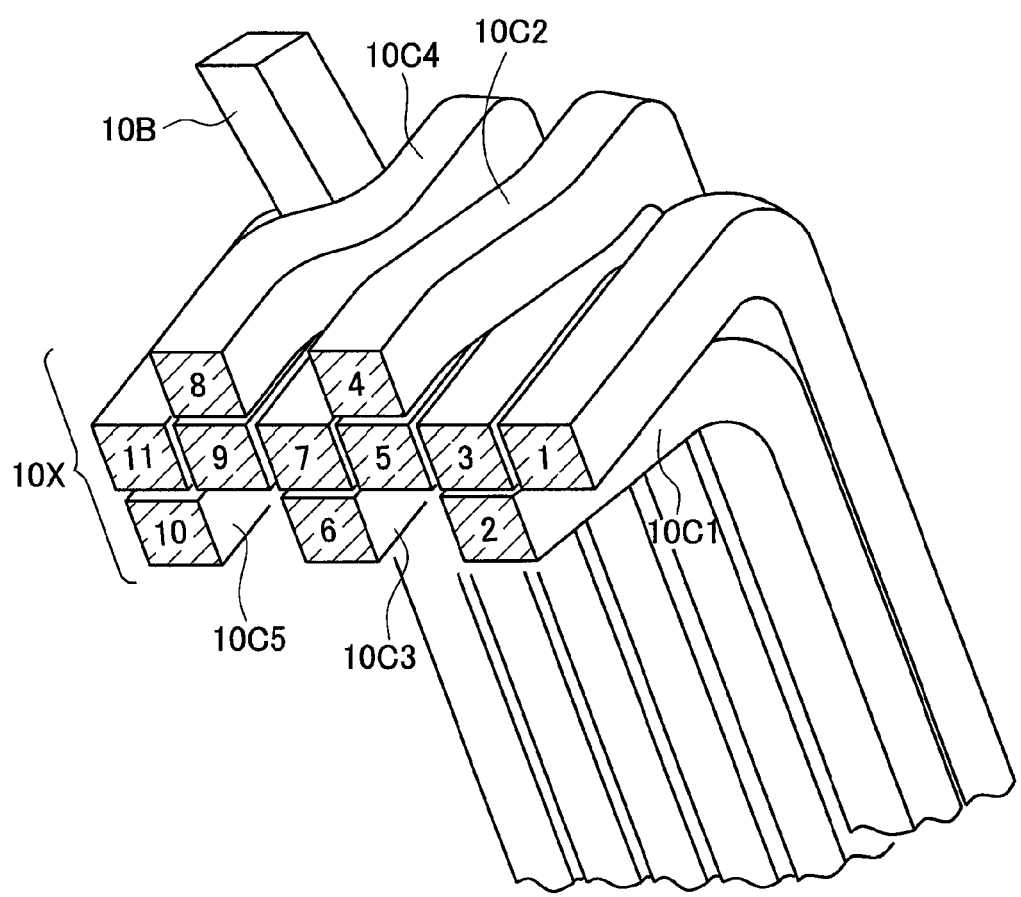
FIG. 5 is a cross sectional view of a lead side of the coil in the first embodiment.

FIG. 5 is a cross sectional view of a lead side of a coil, viewed along arrows A in FIG. 1.

By the above winding steps, the rectangular conductor 20 is wound in two layers at an opposite-lead side 10Y of the coil 10 and on both sides thereof. At the lead side 10X of the coil 10, the conductor 20 is formed in three layers.

This is because it is necessary to form the second bridging portion 10C2 and a fourth bridging portion 10C4 on an upper side to detour around the conductor 20 wound inside as shown in FIG. 5, and the first bridging portion 10C1, the third bridging portion 10C3, and a fifth bridging portion 1005 on a lower side to detour the conductor 20 wound outside.

As a result, the odd-numbered turns of the coil 10 are formed in the second layer while the even-numbered turns are formed in the first layer or the third layer.

A winding device of the coil 10 will be briefly explained below.

Figure 6:
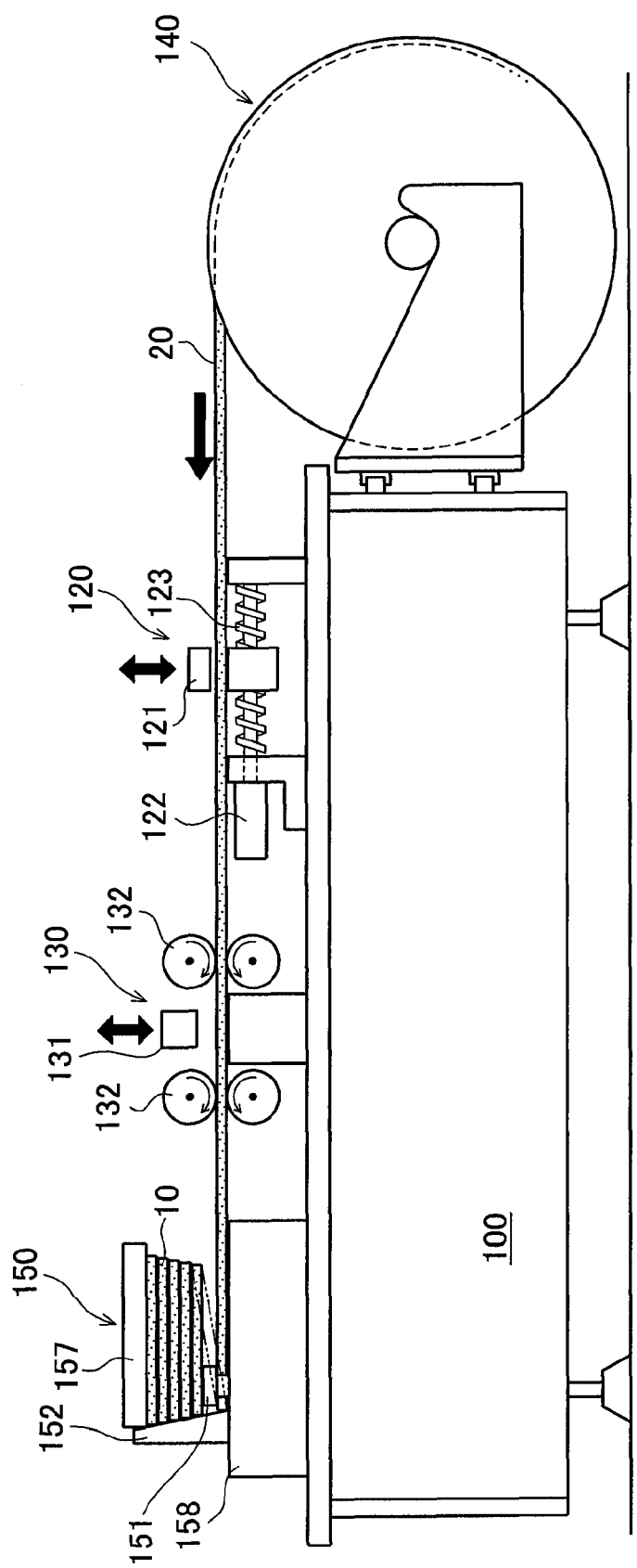
FIG. 6 is a schematic view of a device in the first embodiment.
Figure 7:
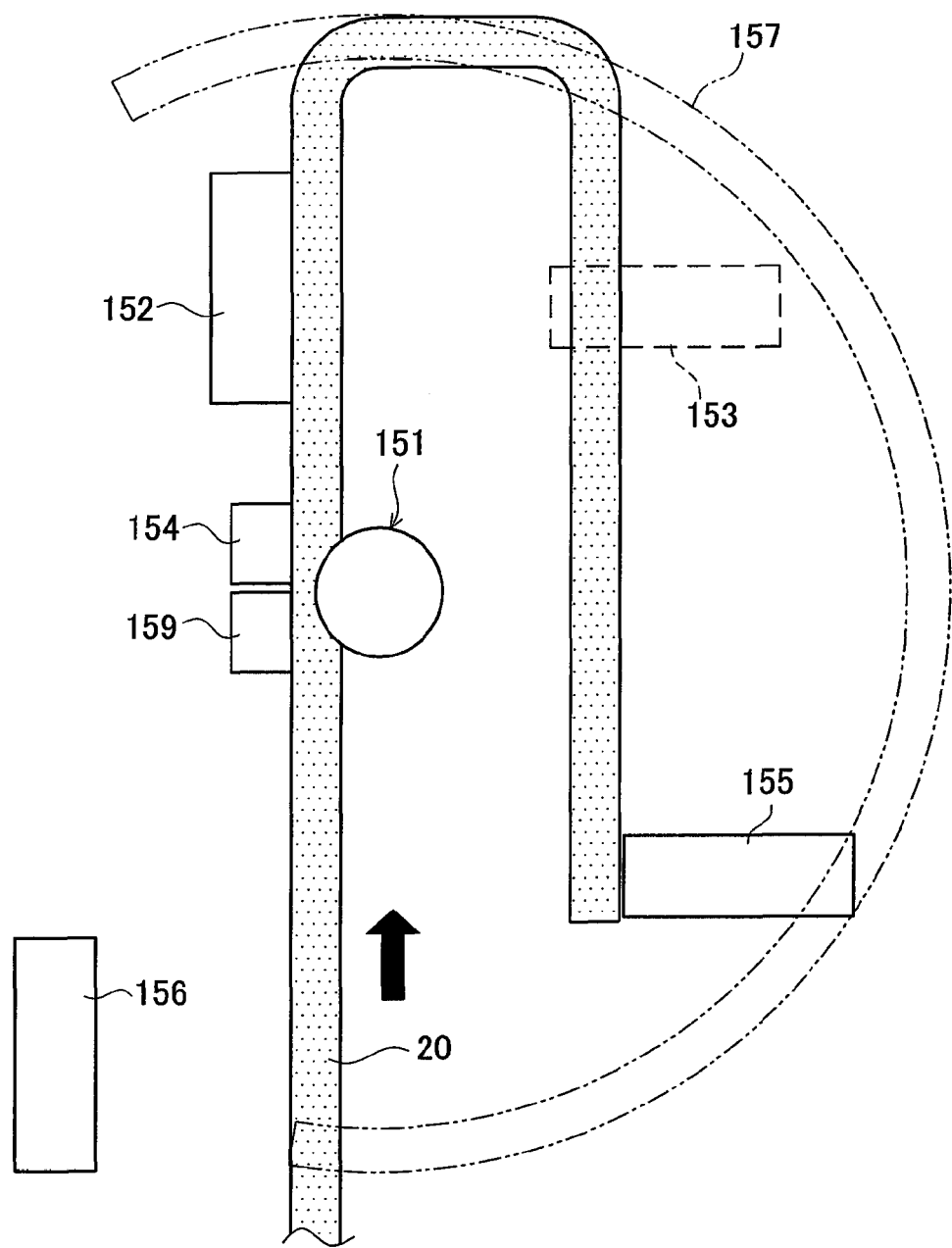
FIG. 7 is a schematic diagram of a winding step 1 in the first embodiment.
Figure 8:
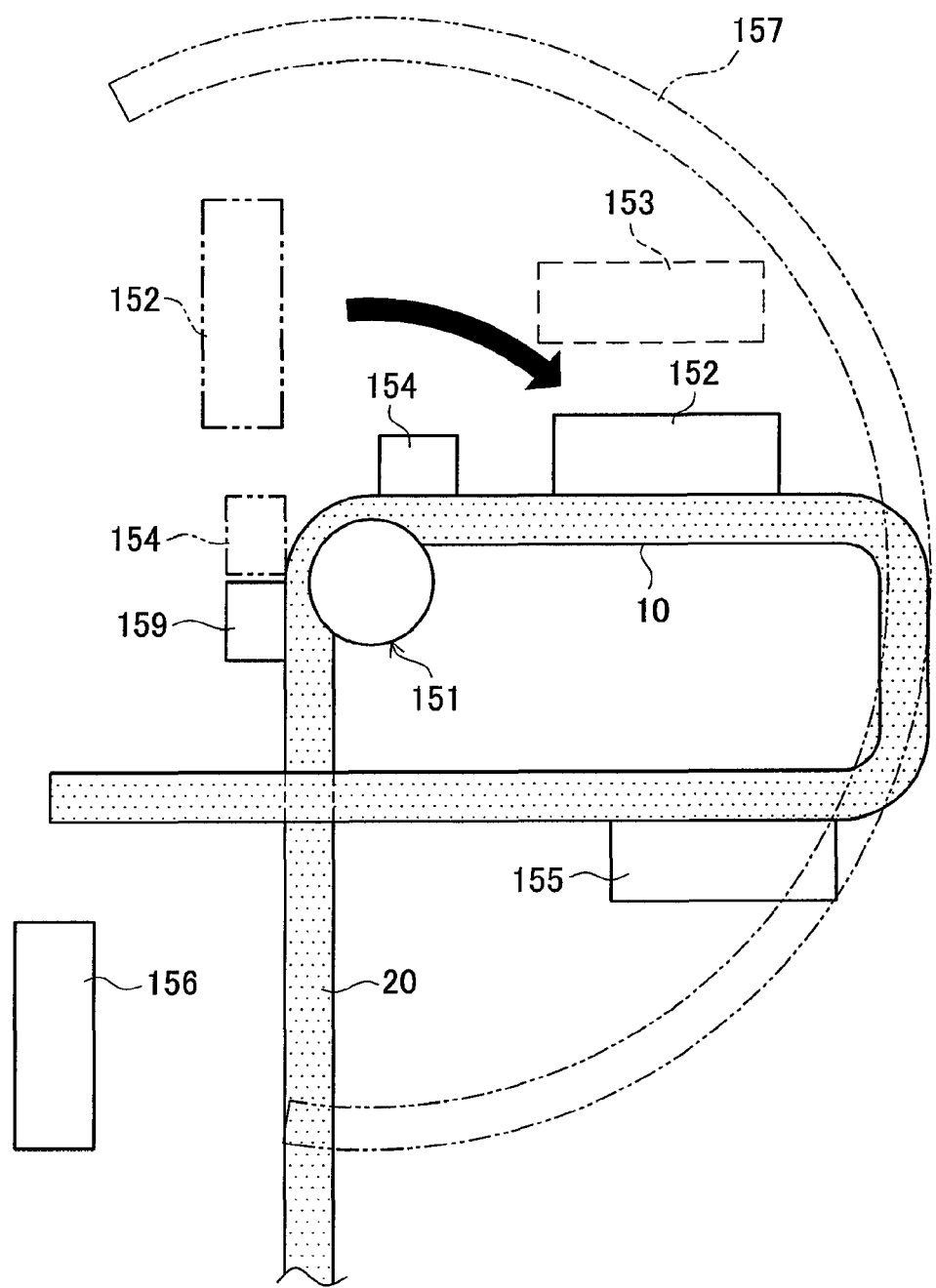
FIG. 8 is a schematic diagram of a winding step 2 in the first embodiment.

FIG. 6 is a schematic view of the device. FIG. 7 is a schematic plan view of a winding step 1. FIG. 8 is a schematic plan view of a winding step 2.

The winding device 100 includes an uncoiler 140, a feed mechanism 120, a damper 130, and a winding mechanism 150.

The feed mechanism 120 is a device to feed the rectangular conductor 20. This mechanism 120 is configured to grasp the rectangular conductor 20 with a feed damper 121 and then draw the conductor 20 from the uncoiler 140. The feed damper 121 is controlled to move by a predetermined amount by a ball screw 23 connected to a servo motor 122. The damper 130 is provided with a retaining damper 131 and a feed roller 132. The retaining damper 131 and the feed damper 121 alternately clamp the conductor 20.

The winding mechanism 150 is configured to edgewise bend the rectangular conductor 20 to form the coil 10.

An inner circumferential jig 151 is a member for holding a surface of the rectangular conductor 20 which will be the inner circumferential side of the coil 10 on completion. A first rotating jig 152 and a first bending jig 154 are moved by rotation as shown in FIGS. 7 and 8 to edgewise bend the conductor 20. A second rotating jig 153 is also used to edgewise bend the conductor 20.

A first guide 155 and a second guide 156 are jigs for guiding the opposite surface of the conductor 20 to the surface contacting the first rotating jig 152 and the second rotating jig 153 when the conductor 20 is edgewise bent. The guides 155 and 156 are therefore appropriately retractable when the coil 10 is wound.

An upper support 157 is a guide member to support an upper surface of the coil 10 and configured to gradually move upward as winding of the coil 10 proceeds. A fixed guide 159 is intended to support the rectangular conductor 20 moving straight. Those mechanisms are arranged on a base 158.

With those mechanisms, the rectangular conductor 20 is edgewise bent as shown in FIGS. 7 and 8, thereby forming the coil 10. The detailed explanation thereof is omitted.

The coil 10 in the first embodiment exhibiting the above configuration and operation can provide the advantages described below.

As a first advantage, the rectangular conductor 20 with a reduced thickness can be used.

The stator 50 in the first embodiment includes the stator core pieces 30 each formed with the teeth portions 31 and the slots 32, and the coils 10 each inserted in the slots 32 while the conductor in a wound state forms a plurality of layers (two layers) in the circumferential direction of the core pieces 30. In each coil 10, the conductor is wound from an outer layer to an inner layer in the first row, from the inner layer to the outer layer in the second row, and from the outer layer to the inner layer in the third row. The number of layers of a portion of the coil 10 inserted in a slot 32 is two, while the number of layers in a coil end portion on at least one side is three or more.

The coil 10 is configured, as shown in FIGS. 1 and 2, to have two layers in the circumferential direction of the core unit 25 and six rows (four rows in FIG. 2 by omission) in the radial direction of the core unit 25. At the lead side 10X, three layers are formed.

Accordingly, the number of the conductor sections is smaller in the circumferential direction of the core unit 25. The winding of the coil 10 proceeds in the circumferential direction of the core unit 25. After the winding is performed by two layers, it proceeds in an inverse direction. The winding device 100 stores in advance a program for winding the coil 10. Accordingly, the feed mechanism 120, the damper 130, the uncoiler 140, and the winding mechanism 150 of the winding device 100 are operated according to the program to wind the coil 10.

By winding conducted as above, a potential difference between the adjacent portions of the rectangular conductor 20 only corresponds to three turns; specifically, between a first turn and a fourth turn, between a third turn and a fifth turn, between a sixth turn and an eighth turn, and so on.

As shown in Patent Documents 1 and 2, when winding proceeds in a direction in which the number of the conductor sections is larger, if a potential difference between a winding start portion 10A and a winding end portion 10B of a coil 10 with twelve turns is 100V, the start portion 10A and the end portion 10B of the rectangular conductor 20 are adjacently located. Accordingly, the conductor 20 has to be covered with an insulating coating film 21 resistant to a potential difference of 100V.

In contrast, according to the method of the first embodiment, in the case of a coil 10 with twelve turns, a potential difference is as small as one-third of the above. Thus, the thickness of the insulating coating film 21 can be made thinner by just that much.

Since the thickness of the insulating coating film 21 can be reduced as above, the film 21 occupies only a space at a small ratio in each slot of the stator 50, thus enabling improvement of the space factor.

Further, the thinner thickness of the film 21 can also contribute to cost reduction by just such a decreased film thickness.

Patent Document 4 mentions the coil 200 but fails to disclose the processing of a coil end. Thus, the method of Patent Document 4 could not directly manufacture the coil 200. This method seems to be uncompleted. In contrast, the present embodiment of the invention discloses a manufacturing method of the coil 10 in detail. Specifically, for the processing of the lead side 10X of the coil 10, the inner-layer-side bridging portions such as the first bridging portion 10C1 and the third bridging portion 10C3 and the outer-layer-side bridging portions such as the second bridging portion 10C2 are formed to provide a three-layered configuration at the lead side 10X to enable winding of the coil 10.

Further, the coil 10 and the core unit 25 are insulated from each other by the insulator 26. For insulation between the coil ends at the lead side 10X and the non-lead side 10Y formed on both end faces of the core unit 25, a method of using an interphase sheet or other method are conceivable. It is therefore only necessary to simply determine the thickness of the insulating coating film 21 according to the potential difference between adjacently located portions of the rectangular conductor 20.

The winding start position of the coil 10 is set in an outermost position in a circumferential direction of the core unit 25. This can achieve a reduction in the number of rows.

In the coil 10 of the present embodiment, the winding start portion 10A is on an outer circumferential side of the coil 10 and also the winding end portion 10B is on the outer circumferential side of the coil 10. Thus, the start portion 10A and the end portion 10B do not interfere with the coil 10.

If the winding start portion 10A or the winding end portion 10B is located on the first layer side of the coil 10, for instance, the rectangular conductor 20 to be located at the lead side 10X has to be wound by detouring the start portion 10A or the end portion 10B. In this case, the rectangular conductor 20 has to detour outward or inward of the coil 10 by a distance corresponding to the thickness of the conductor 20. Therefore, the coil 10 is apt to involve redundant thickness.

Since the coil 10 is a two-layered coil, it can reduce the thickness of the stator 50.

In the case where the rectangular conductor 20 is edgewise bent by the winding device 100, it is hard to edgewise bend the conductor 20 with a bend or curve having a diameter equal to or smaller than the width of the conductor 20.

Accordingly, it is possible to maintain the width of a coil end more equally than in edgewise bending a rectangular conductor 20 having a double width in a single layer configuration.

Figure 9:
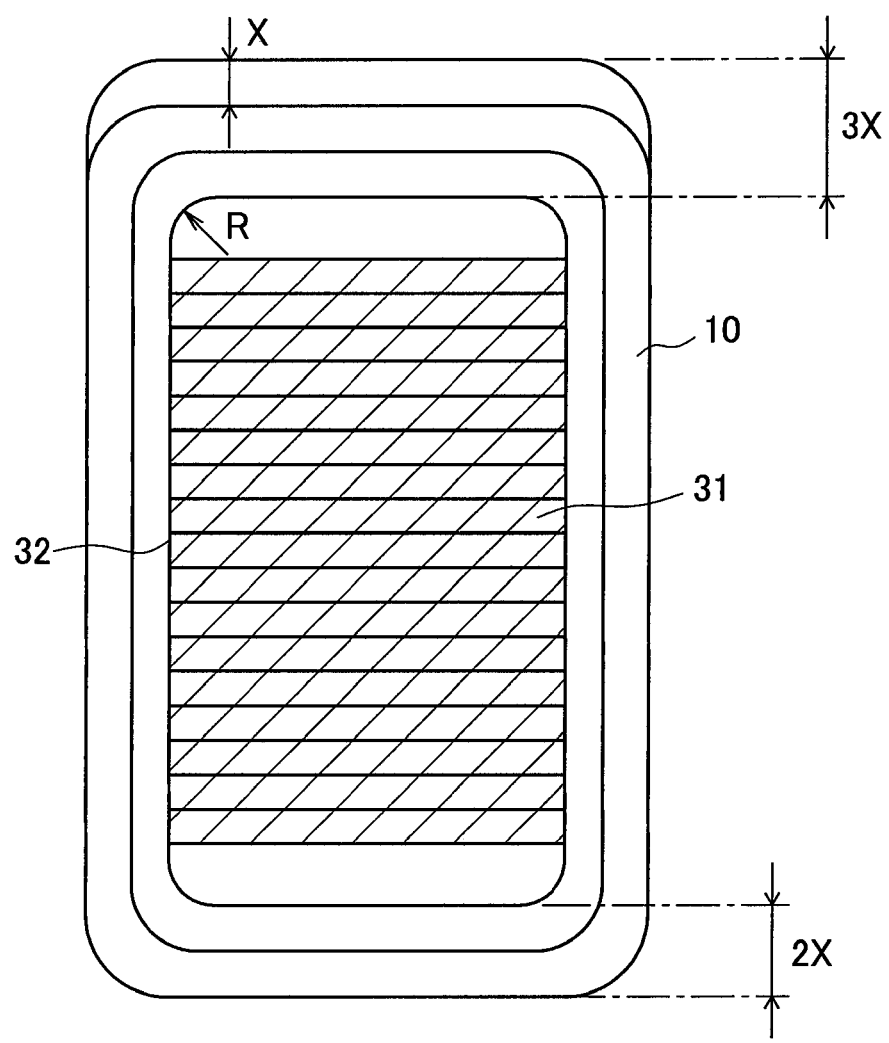
FIG. 9 is a cross sectional view showing a relationship between a coil and a teeth portion in the first embodiment.
Figure 10:
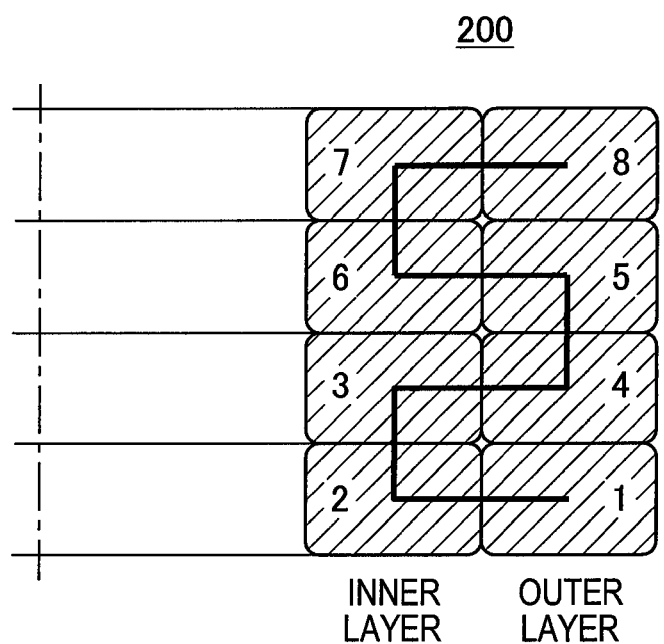
FIG. 10 is a cross sectional view of a coil in Patent Document 4.
Figure 11:
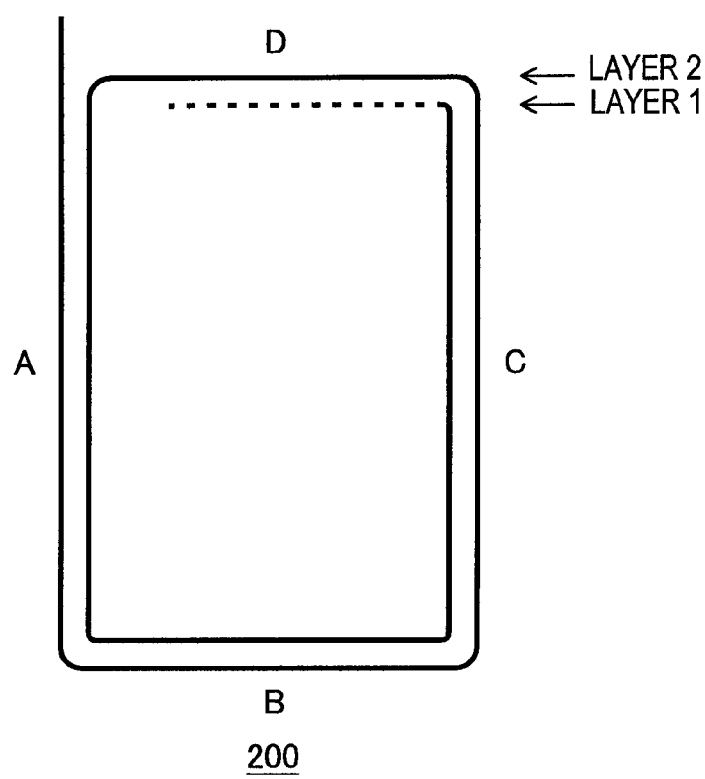
FIG. 11 is a schematic diagram showing the order of winding wind a first row of the coil in Patent Document 4.
Figure 12:
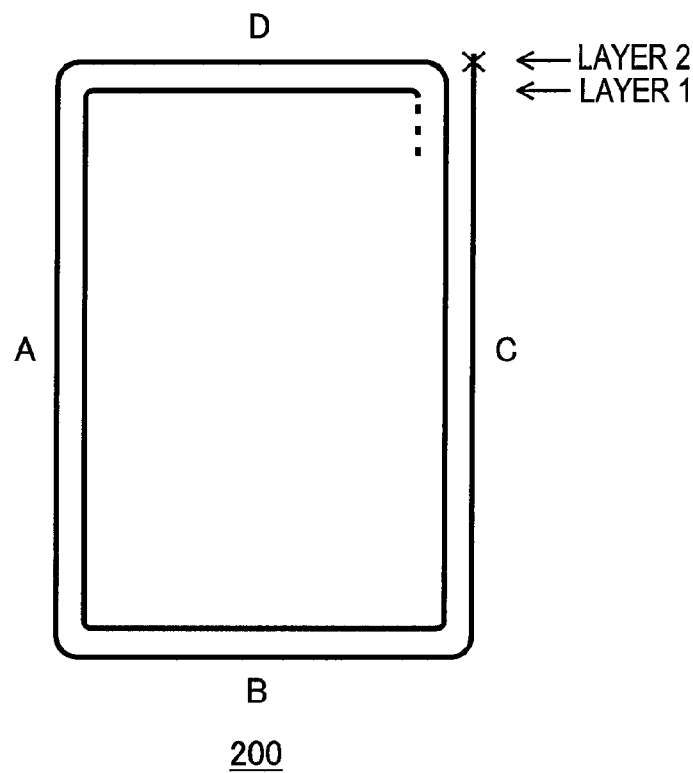
FIG. 12 is a schematic diagram showing the order of winding a second row of the coil in Patent Document 4.

FIG. 9 is a cross sectional view showing a relationship between a coil and a teeth portion.

A section of the coil 10 to be inserted in a slot 32 between teeth portions 31 needs to be straight.

Accordingly, the thickness of a coil end is R+width X in a single-layered coil and R+width X×3 in a two-layered coil. Bending R is equal to the width X and hence the single-layered coil needs a thickness of 2X and the two-layered coil needs a thickness of 4X at each coil end. Assuming that the width X is 10 mm, the thickness of the single-layered coil at the coil end is 20 mm and that of the two-layered coil is 20 mm. Thus, the thickness of the lead side 10X is theoretically the same in the single-layered coil and the two-layered coil.

At the non-lead side 10Y, the single-layered coil has a thickness of 2X and the two-layered coil has a thickness of 3X. The coil end of the two-layered coil can be thinner than that of the single-layered coil.

Consequently, from the viewpoint of the entire stator 50, the two-layered coil 10 can more contribute to a reduction in thickness of the stator 50.

A second embodiment of the invention will be described below.

(Second Embodiment)

The second embodiment of the invention is slightly different from the first embodiment in the number of turns of a coil 10 and the shape of a bridging portion. The following explanation is focused on such differences.

Figure 13:
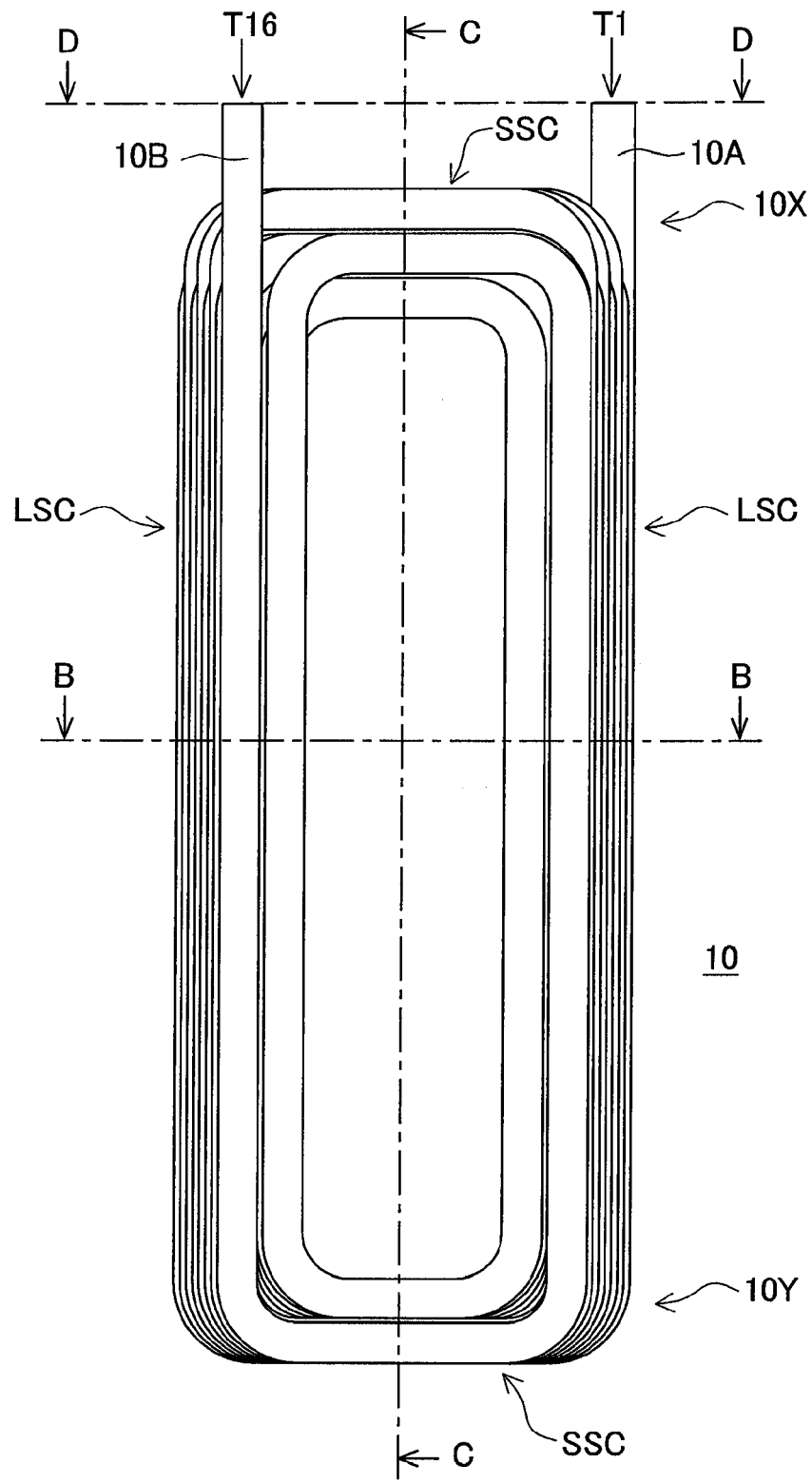
FIG. 13 is a plan view of a coil in a second embodiment.
Figure 14:
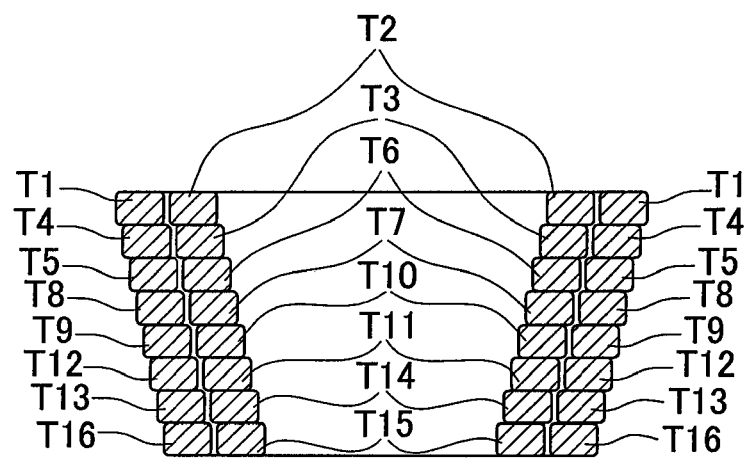
FIG. 14 is a cross sectional side view of the coil in the second embodiment.
Figure 15:
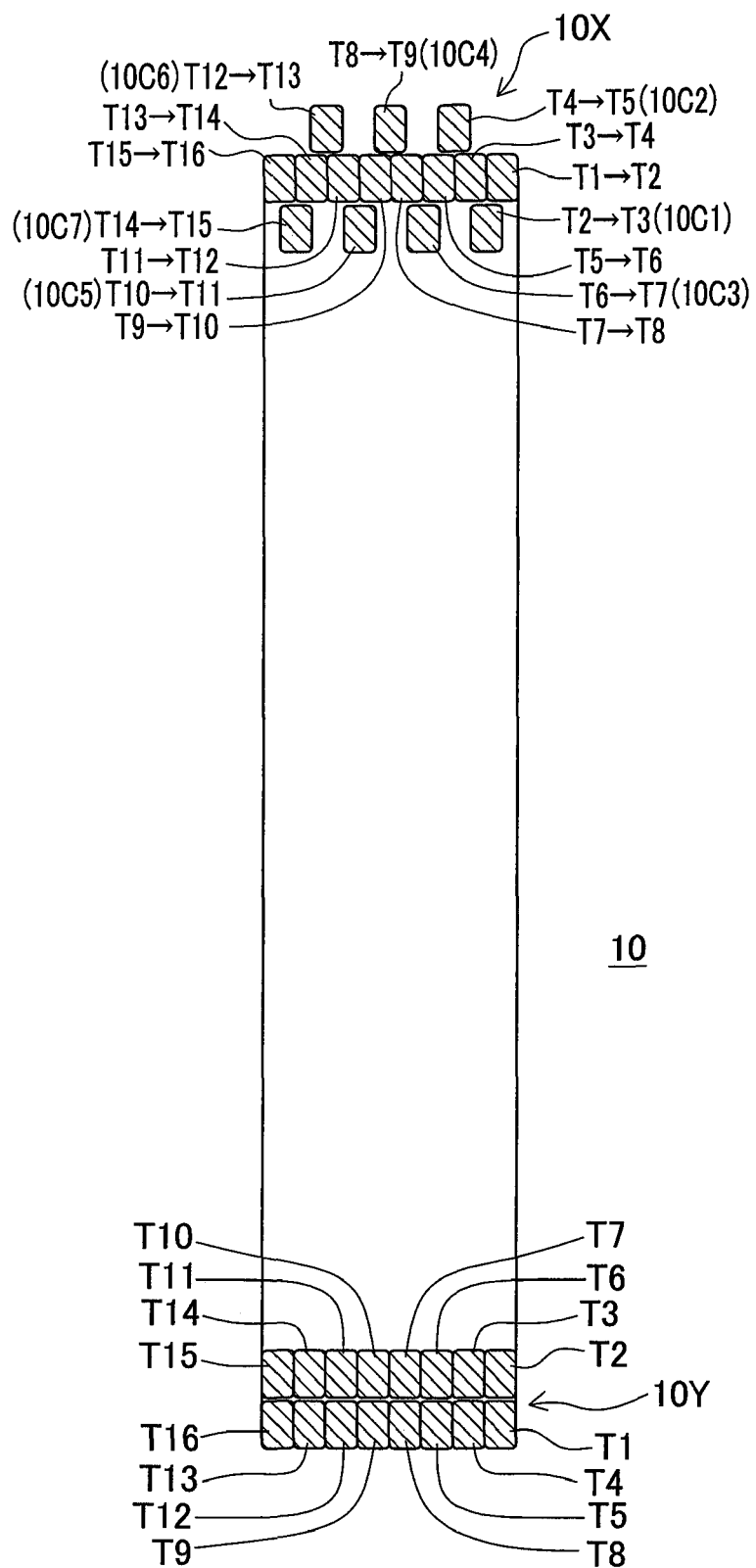
FIG. 15 is a cross sectional side view of the coil in the second embodiment.

FIG. 13 is a plan view of a coil in the second embodiment. FIG. 14 is a cross sectional side view of the coil taken along a line B-B in FIG. 13. FIG. 15 is a cross sectional side view of the coil taken along a line C-C in FIG. 13.

The coil 10 in the second embodiment, as with the coil 10 of the first embodiment, is formed by winding a flat rectangular conductor 20 in two layers so that a lead side 10X which is one of the coil ends provides a three-layered configuration. In this respect, the second embodiment is identical to the first embodiment except that the coil 10 of the second embodiment has two layers and eight rows (2-layer×8-row), i.e., a total of sixteen turns.

Accordingly, a winding starts from the winding start portion 10A to form a first turn T1 for LAYER 2-ROW 1, a second turn T2 for LAYER 1-ROW 1, a first bridging portion 10C1 extending from LAYER 1-ROW 1 to LAYER 1-ROW 2, and shifts to a third turn T3 for LAYER 1-ROW 2. Then, the winding makes a fourth turn T4 for LAYER 2-ROW 2 and a second bridging portion 10C2 extending from LAYER 3-ROW 2 to LAYER 3-ROW 3, and shifts to a fifth turn T5 for LAYER 2-ROW 3.

A sixth turn T6 following the fifth turn T5 is formed for LAYER 1-ROW 3. A third bridging portion 10C3 is formed to extend from LAYER 1-ROW 3 to LAYER 1-ROW 4, thereby forming a seventh turn T7 for LAYER 1-ROW 4. An eighth turn T8 is formed for LAYER 2-ROW 4, a fourth bridging portion 10C4 is formed to extend from LAYER 3-ROW 4 to LAYER 3-ROW 5, thereby forming a ninth turn T9 for LAYER 2-ROW 5.

A tenth turn T10 following the ninth turn T9 is formed for LAYER 1-ROW 5, a fifth bridging portion 10C5 is formed to extend from LAYER 1-ROW 5 to LAYER 1-ROW 6. Then, an eleventh turn T11 is formed for LAYER 1-ROW 6. Sequentially, a twelfth turn T12 is formed for LAYER 2-ROW 6, a sixth bridging portion 1006 is formed to extend from LAYER 3-ROW 6 to LAYER 3-ROW 7, and then a thirteenth turn T13 is formed for LAYER 2-ROW 7.

A fourteenth turn T14 following the thirteenth turn T13 is formed for LAYER 1-ROW 7, a seventh bridging portion 1007 is formed to extend from LAYER 1-ROW 7 to LAYER 1-ROW 8, and then a fifteenth turn T15 is formed for LAYER 1-ROW 8. A sixteenth turn T16 is formed for LAYER 2-ROW 8, extending to the winding end portion 10B.

Figure 16:
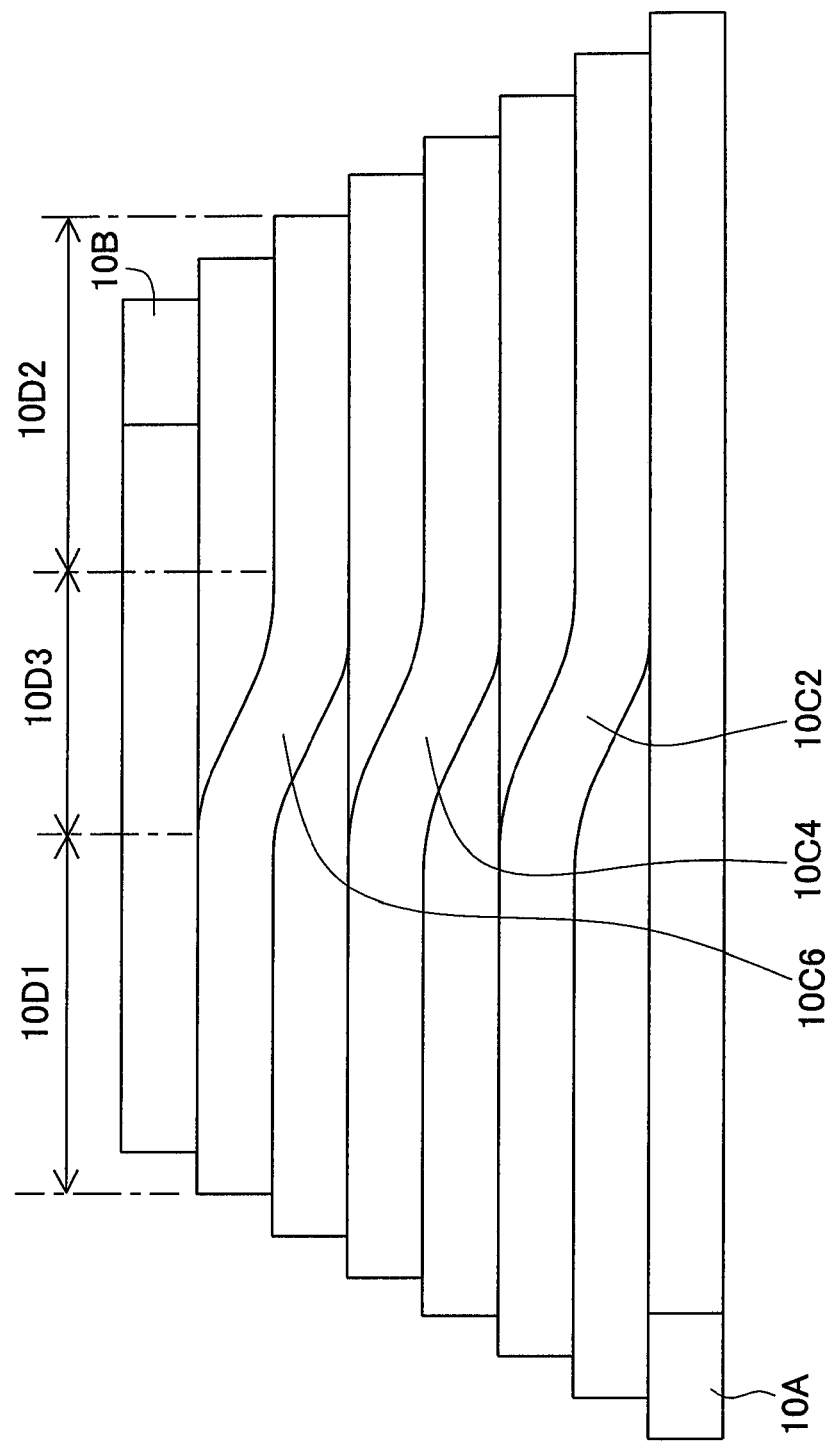
FIG. 16 is a side view of the coil in the second embodiment.

FIG. 16 is a side view of the coil, viewed along arrows D in FIG. 13.

The second bridging portion 10C2, the fourth bridging portion 10C4, and the sixth bridging portion 1006 are formed on an outer side of the lead side 10X as shown in FIG. 16, that is, in the third layer, while the first bridging portion 10C1, the third bridging portion 10C3, the fifth bridging portion 10C5, and the seventh bridging portion 10C7 are similarly formed on an inner side of the lead side 10X of the coil not shown, that is, in the first layer.

At the non-lead side 10Y of the coil 10, on the other hand, only two layers are formed as mentioned above as with other two sides as shown in FIG. 15 and no bridging portion is formed.

The first bridging portion 10C1 to the seventh bridging portion 10C7 each include three regions; a first end section 10D1, a second end section 10D2, and a lane change section 10D3 joining the first end section 10D1 and the second end section 10D2.

Figure 17:
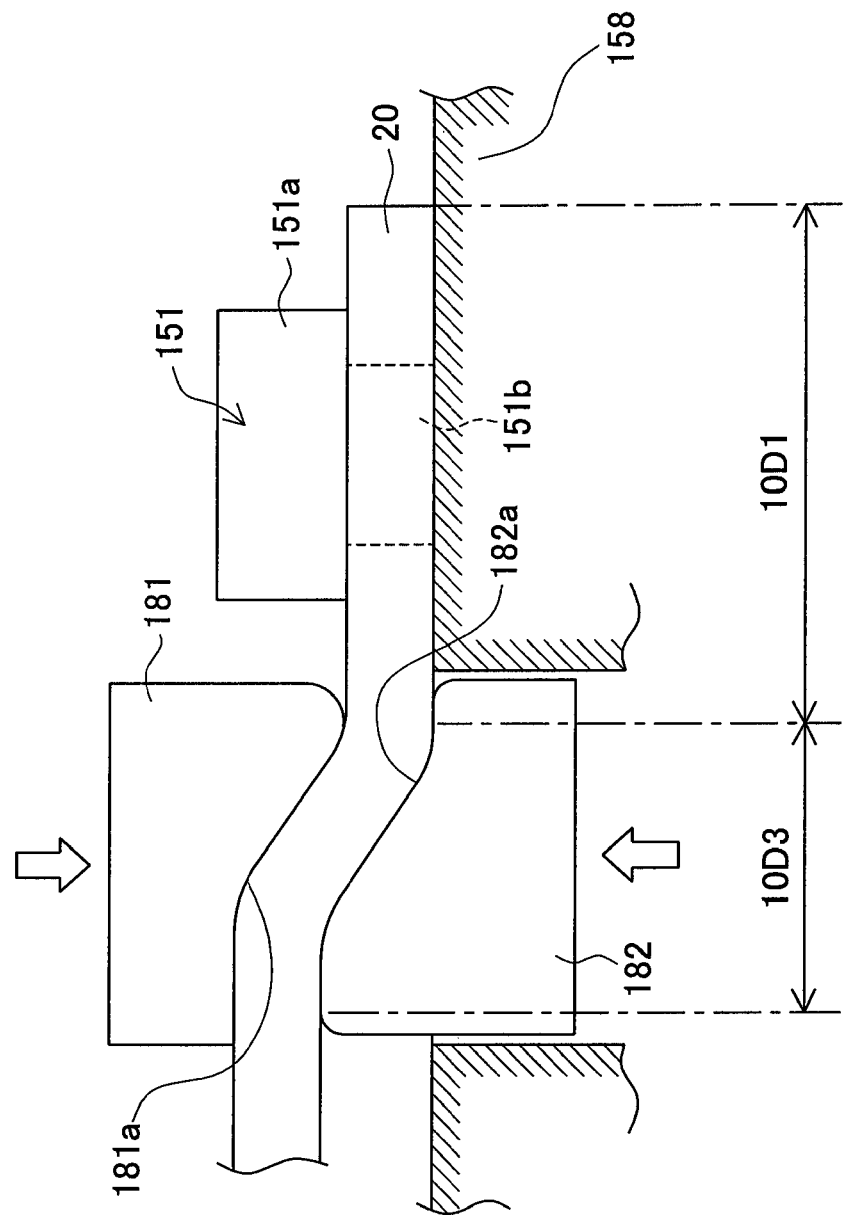
FIG. 17 is a schematic diagram showing a manner of forming a lane change section in the second embodiment.

FIG. 17 is a schematic view showing a manner of forming a lane change section.

The lane change section 10D3 is formed by use of an upper die 181 and a lower die 182 provided in a base 158 of the winding device 100 shown in FIG. 6. The upper die 181 is formed with a first die surface 181a to form the lane change section 10D3 while the lower die 182 is formed with a second die surface 182a.

The edgewise-bent rectangular conductor 20 is pressed by the upper die 181 and the lower die 182 sandwiching therebetween the conductor 20, thereby forming the lane change section 10D3 between the first end section 10D1 and the second end section 10D2. This lane change section 10D3 is formed on a short side of the coil 10 wound in a rectangular form.

The upper die 181 and the lower die 182 are connected to a thrust power generator not shown which has a pressure function by moving from above and below in FIG. 17 to hold the rectangular conductor 20 therebetween. The upper die 181 and the lower die 182 are configured to be retract to regions where the dies are not interfere with the conductor 20 in winding the conductor 20 to form a coil 10.

The first end section 10D1 and the second end section 10D2 can exhibit their functions as long as they have a width of about several millimeters. Accordingly, depending on the necessary width to form the lane change section 10D3, the width of the first end section 10D1 and the second end section 10D2 is determined.

The first end section 10D1 and the second end section 10D2 are formed with a shape conforming to a portion of the rectangular conductor 20 forming an adjacent layer. Specifically, as shown in FIG. 16, the first end section 10D1 of the first bridging portion 10C1 has a shape conforming to the connection side between the first turn T1 in the second layer and the second turn T2, which are adjacent to each other in a short side SSC of the lead side 10X. The second end section 10D2 of the first bridging portion 10C1 has a shape conforming to the connection side between the third turn T3 in the second layer and the fourth turn T4, which are adjacent to each other in the short side SSC of the lead side 10X.

The coil 10 made by winding the rectangular conductor 20 in the configuration as shown in the second embodiment provides the following operations and advantages.

As a first advantage, the wound coil can have a reduced thickness, resulting in an increased space factor of the stator 50.

Figure 18:
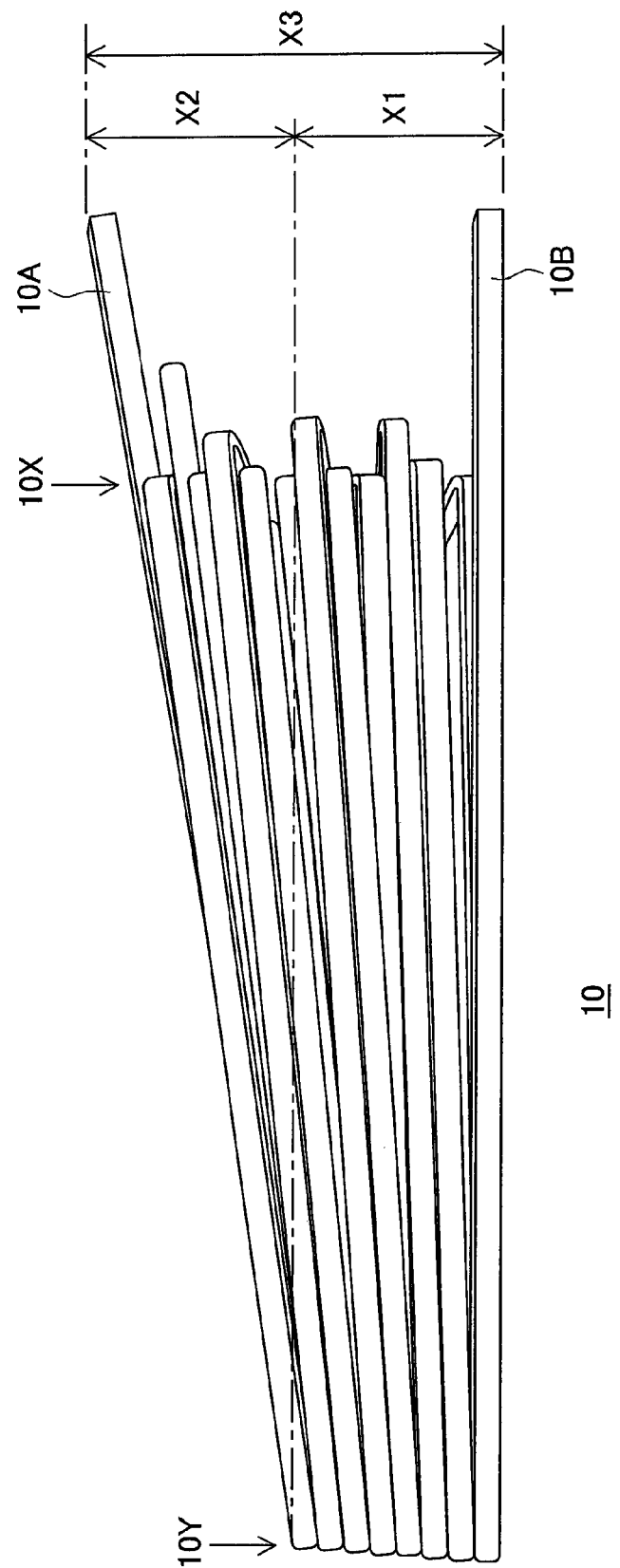
FIG. 18 is a perspective view of a coil formed by a coil winding method without forming a lane change section, shown for comparison.
Figure 19:
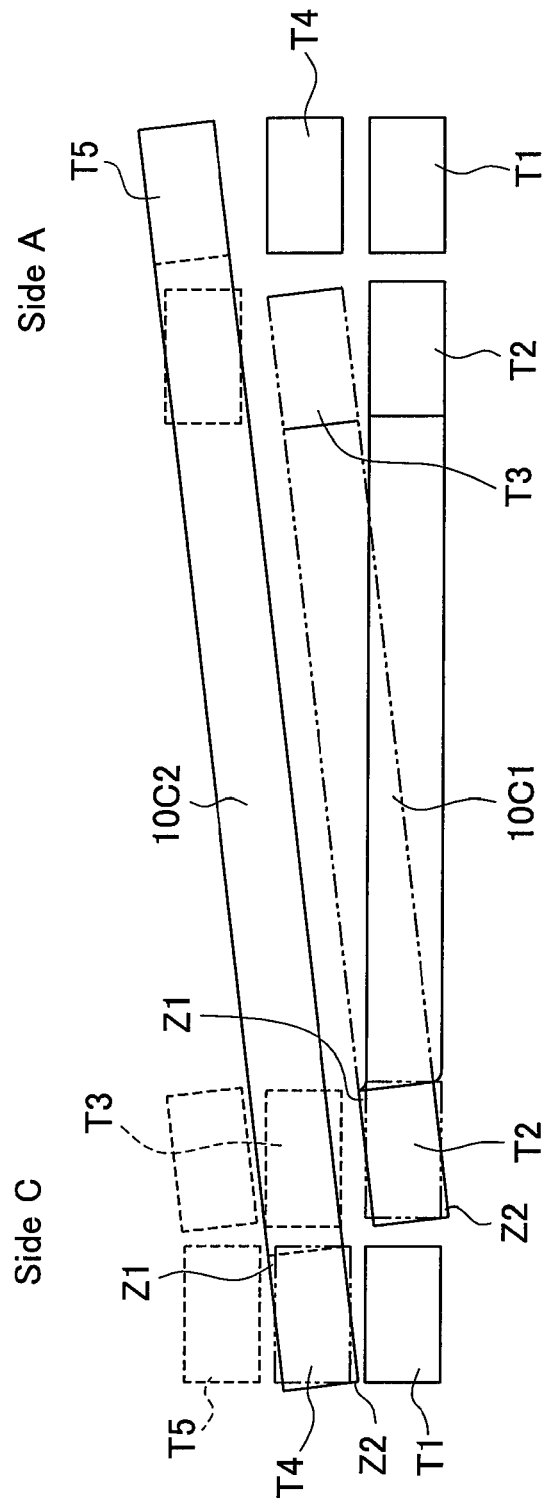
FIG. 19 is a schematic cross sectional view of a coil formed by a coil winding method without forming a lane change section, shown for comparison.

FIG. 18 is a perspective view of a coil produced by a coil winding method that forms no lane change section. FIG. 19 is a schematic cross sectional view of the coil produced by the coil winding method that forms no lane change section.

In the stator 50 in the second embodiment, at least one of the first bridging portion 10C1 and the second bridging portion 10C2 includes the first end section 10D1, the second end section 10D2, and the lane change section 10D3 between the first end section 10D1 and the second end section 10D2. These first and second end portions 10D1 and 10D2 are formed along the adjacent layer, that is, the second layer of the rectangular conductor 20. The conductor 20 is lane-changed to an adjacent row (e.g., from the first row to the second row for the first bridging portion 10C1) in the lane change section 10D3.

With the lane change section 10D3 in each of the first bridging portion 10C1 to the seventh bridging portion 10C7, the thickness of the coil 10 can be minimized.

If the rectangular conductor 20 is wound to form a coil 10 without providing the lane change section 10D3, this coil 10 will be widened by a bulging X2 as shown in FIG. 18 depending on the shape of the bridging portions. The thickness of the lead side 10X provided with the bridge is a thickness X3, while the thickness of the non-lead side 10Y is a thickness X1. Thus, the thickness of the lead side 10X is thicker by a difference from that of the non-lead side 10Y. If the coil bulges in this way, it becomes a factor of deteriorating the space factor when the coil is inserted in the core unit 25.

The conceivable reason thereof results from interference between the portions of the rectangular conductor 20 caused by the processing of the bridging portions.

Each of the first bridging portion 10C1 to the seventh bridging portion 10C7 is formed in the short side SSC of the coil 10. However, the bridging portions may come into such a state as shown in FIG. 19 depending on the material of the rectangular conductor 20 and the length of the short side SSC. An upper interference region Z1 and a lower interference region Z2 come about in a long side LSC, causing a bulging portion at the lead side 10X.

To be concrete, if the first bridging portion 10C1 is formed in the short side SSC as shown in FIG. 19, a portion of the rectangular conductor 20 in the long side LSC is also twisted. This may generate the upper interference region Z1 and the lower interference region Z2 in the long side LSC. These upper and lower interference regions Z1 and Z2 are regions that may cause interference with adjacently located portions of the rectangular conductor 20 and may be formed mainly in the long side LSC close to the lead side 10X.

These upper and lower interference regions Z1 and Z2 have only a little influence on the adjacently located portions of the conductor 20, but the influence becomes remarkably larger as the number of turns increases.

Further, the upper and lower interference regions Z1 and Z2 cause problems only in a multilayered wound coil 10.

Specifically, as shown in FIG. 19, the side A of the first turn T1 is formed horizontal from the winding start portion 10A and also the side C is formed horizontal. The side A of the second turn T2 is also formed horizontal. However, the side C of the second turn T2 continues to the first bridging portion 10C1 connecting to the side A of the third turn T3 formed in an adjacent row. Thus, the side C of the second turn T2 and the side A of the third turn T3 are twisted.

The side C of the third turn T3 is formed horizontal and the side A of the fourth turn T4 A is also formed horizontal. The side C of the fourth turn T4 and the side A of the fifth turn T5 are twisted because they are continuous to the second bridging portion 10C2.

As a result, the horizontally formed sides and the twisted sides are both contained in the long side LSC. Thus, the upper interference region Z1 and the lower interference region Z2 cause problems, resulting in an increased thickness of the lead side 10X at which twisting influence is present. Such a problem is less likely to occur in a single-layered coil including a wire is wound in a uniform shape in all rows. This problem is considered as being specific to a multilayered coil.

However, the coil 10 formed with the lane change section 10D3 as in the second embodiment can solve such problems.

The reason thereof is as follows. With the first end section 10D1 and the second end section 10D2 formed on both sides of the lane change section 10D3, the lane change can be completed in concentric manner in the lane change section 10D3. This results in no influence of the lane change on the long side LSC.

In other words, the first end section 10D1 and the second end section 10D2 are formed in a shape conforming to the adjacent layers, so that the influence of the lane change section 10D3 on the long side LSC can be suppressed. Thus, the coil 10 can be wound with a reduced thickness.

A conceivable method is achieved by twisting the long side or twisting the connection portion between the long side LSC and the short side SSC to make the long side LSC longer than the width of the core unit 25, thereby minimizing the influence of twisting in the slot of the core unit 25, that is, the influence of the upper interference region Z1 and the lower interference region Z2. However, this configuration results in a longer coil end, which will disturb reduction in size. This configuration also needs a longer rectangular conductor to be used for a coil 10, which will disturb reduction in cost.

Specifically, the first end section 10D1 and the second end section 10D2 in the bridging portion even though they are short can also contribute to reduction in size and cost.

The present invention is explained along the above embodiments but is not limited thereto. The present invention may be embodied in other specific forms without departing from the essential characteristics thereof.

For instance, the material of the coil 10 and the material of the insulating coating and others may be any changed from the exemplified materials. Furthermore, the winding using the winding device 100 is just an example. Another type of winding device may be used to form a coil 10.

The number of turns of the coil 10 may be increased or decreased. In particular, the coil ends on the lead side and the non-lead side are preferably small but do not give any limit to an increase in the number of layers. The winding method shown in the above embodiments should be selected appropriately according to the width of a slot 32 and the necessary number of turns of a coil 10.

DESCRIPTION OF THE REFERENCE SIGNS

10 Coil
10A Winding start portion
10B Winding end portion
10C1 First bridging portion
10C2 Second bridging portion
10C3 Third bridging portion
10C4 Fourth bridging portion
10C5 Fifth bridging portion
10X Lead side
10Y Non-lead side
20 Flat rectangular conductor
21 Insulating coating film
25 Split core unit
26 Insulator
27 Outer ring
30 Stator core piece
31 Teeth portion
32 Slot
50 Stator
100 Winding device

The invention claimed is:

1. A stator including a split type stator core formed with a teeth portion and a slot, and a coil made of a conductor in a wound state including rectangular shape having a long side and a short side including a plurality of layers (n layers) in a circumferential direction of the stator core when the coil is inserted in the slot,
wherein the coil includes a first row wound from an outer layer toward an inner layer, a second row wound from the inner layer toward the outer layer, a third row wound from the outer layer toward the inner layer, a fourth row wound from the inner layer toward the outer layer, a fifth row wound from the outer layer toward the inner layer,
the coil has an outer end portion positioned on an outer circumferential side and an inner end portion positioned on an inner circumferential side, each protruding from the coil in an axial direction of the stator,
the coil includes a coil end on a lead side having the outer and inner end portions and a coil end on a non-lead side not having the outer and inner end portions, both the coil ends protruding from an end surface of the state core in the axial direction,
with respect to the number n of layers wound around the split type stator core of an insertion portion of the coil including the coil end portion on the non-lead side inserted in the slot, the number of layers wound around the split type stator core in a coil end portion on a lead side is n+1 or more,
wherein the coil includes:
a first bridging portion and a third bridging potion formed in an innermost layer in the coil end on the lead side and arranged in positions corresponding to alternate ones of the first to fourth rows in the radial directions so that the first bridging portion connects the first row and the second row and the third bridging portion connects the third row and the fourth row,
a second bridging portion and a forth bridging portion formed in an outermost layer in the coil end on the lead side and arranged in positions corresponding to alternate ones of the first to fourth rows in the radial direction so that the second bridging portion connects the second row and the third row and the fourth bridging portion connects the fourth row and the fifth row, and
the first bridging portion, the third bridging portion, the second bridging portion, and the fourth bridging portion being arranged in a staggered pattern in a cross section of the coil end on the lead side.

2. The stator according to claim 1,
wherein at least one of the first bridging portion and the second bridging portion includes a first end section, a second end section, and a lane change section positioned between the first end section and the second end section,
the first end section and the second end section are formed to conform to the conductor in an adjacent layer, and
the conductor is lane-changed to an adjacent row in the lane change section.

3. A multilayered wound coil for being inserted in a split type stator core including a conductor wound into a rectangular shape having a long side and a short side in a plurality of layers (n layers),
wherein the conductor is wound from an outer layer toward an inner layer in a first row, from the inner layer toward the outer layer in a second row, from the outer layer toward the inner layer in a third row, from the inner layer toward the outer layer in a fourth row, and from the outer layer toward the inner layer in a fifth row,
the coil has an outer end portion positioned on an outer circumferential side and an inner end portion positioned on an inner circumferential side, each protruding from the coil in an axial direction of the stator,
the coil includes a coil end on a lead side having the outer and inner end potions and a coil end on a non-lead side not having the outer and inner end portions, both the coil ends protruding from an end surface of the state core in the axial direction,
the number of layers wound around the split type stator core in a coil end on the non-lead side is n, and the number of layers wound around the split type stator core in a coil end on a lead side is n+1 or more, and
wherein the coil includes:
a first bridging portion and a third bridging portion formed in an innermost layer in the coil end on the lead side and arranged in positions corresponding to alternate ones of the first to fourth rows in the radial direction so that the first bridging portion connects the first row and the second row and the third bridging portion connects the third row and the fourth row,
a second bridging portion and a fourth bridging portion formed in an outermost layer in the coil end on the lead side and arranged in positions corresponding to alternate ones of the first to fourth rows in the radial direction so that the second bridging portion connects the second row and the third row and the fourth bridging portion connects the fourth row and the fifth row, and
the first bridging portion, the third bridging portion, the second bridging portion, and the fourth bridging portion being arranged in a staggered pattern in a cross section of the coil end on the lead side.

4. The multilayered wound coil according to claim 3,
wherein at least one of the first bridging portion and the second bridging portion includes a first end section, a second end section, and a lane change section positioned between the first end section and the second end section, the first end section and the second end section are formed to conform to the conductor in an adjacent layer, and the conductor is lane-changed to an adjacent row in the lane change section.

5. A method of manufacturing a split type stator including a coil wound in a rectangular shape having a long side and a short side in a plurality of layers (n layers) in a circumferential direction of a stator core, the coil being inserted in a slot portion formed in the stator core, wherein the coil is formed by winding a conductor from an outer layer toward an inner layer in a first row, from the inner layer toward the outer layer in a second row, from the outer layer toward the inner layer in a third row, from the inner layer toward the outer layer in a fourth row, and from the outer layer toward the inner layer in a fifth row, the coil has an outer end portion positioned on an outer circumferential side and an inner end portion positioned on an inner circumferential side, each protruding from the coil in the axial direction of the stator, the coil includes a coil end on a lead side having the outer and inner portions and a coil end on a non-lead side not having the outer and inner end portions, both the coil ends protruding from an end surface of the state core in the axial direction, the number of layers wound around the split type stator core in a coil end on the non-lead side is n, and the number of layers wound around the split type stator core in a coil end on a lead side of the coil is n+1 or more, and the coil includes:

a first bridging portion and a third bridging portion formed in an innermost layer in the coil end on the lead side and arranged in positions corresponding to alternate ones of the first to fourth rows in the radial direction so that the first bridging portion connects the first row and the second row and the third bridging portion connects the third row and the fourth row, a second bridging portion and a fourth bridging portion formed in an outermost layer in the coil end on the lead side and arranged in positions corresponding to alternate one of the first to fourth rows in the radial direction so that the second bridging portion connects the second row and the third row and the fourth bridging portion connects the fourth row and the fifth row, and the first bridging portion, the third bridging portion, the second bridging portion, and the fourth bridging portion being arranged in a staggered pattern in a cross section of the coil end on the lead side.

6. The method of manufacturing a stator according to claim 5, wherein a bridging portion to connect adjacent rows is formed in the coil end on the lead side by pressing the bridging portion in an axial direction of the coil with a forming jig.

* * * * *